(12) United States Patent
Foster et al.

(10) Patent No.: US 7,789,218 B2
(45) Date of Patent: Sep. 7, 2010

(54) DRIVE/FRAME ASSEMBLY FOR A RECIPROCATING SLAT CONVEYOR

(75) Inventors: Randall Mark Foster, Madras, OR (US); John Scott Cook, Madras, OR (US); Kenneth A. Stout, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 59 days.

(21) Appl. No.: 12/284,295

(22) Filed: Sep. 19, 2008

(65) Prior Publication Data

US 2009/0078540 A1   Mar. 26, 2009

Related U.S. Application Data

(63) Continuation-in-part of application No. 11/903,765, filed on Sep. 24, 2007, now abandoned.

(51) Int. Cl.
*B65G 25/04* (2006.01)
(52) U.S. Cl. .................. 198/750.5; 198/750.7
(58) Field of Classification Search ............. 198/750.2, 198/750.5, 750.6, 750.7; 414/525.1, 525.9
See application file for complete search history.

(56) References Cited

U.S. PATENT DOCUMENTS

| | | | | |
|---|---|---|---|---|
| 5,638,943 A * | 6/1997 | Foster | ...................... | 198/750.5 |
| 5,931,284 A * | 8/1999 | Foster | ...................... | 198/750.5 |
| 6,003,660 A * | 12/1999 | Foster | ...................... | 198/750.5 |
| 7,380,652 B2 * | 6/2008 | Foster | ...................... | 198/750.5 |
| 2007/0045085 A1 * | 3/2007 | Foster | ...................... | 198/750.1 |

* cited by examiner

*Primary Examiner*—Mark A Deuble
(74) *Attorney, Agent, or Firm*—Bruce A. Kaser

(57) ABSTRACT

Opposite end sections (20, 26) of a piston/cylinder drive unit (14) are clamped to longitudinally spaced apart transverse mounting beams (10, 12), by a fixed clamp parts connected to the mounting beams (10, 12) and removable clamp parts that are connected by bolts to the fixed clamp parts. The piston rod end sections (20, 26) include longitudinal passageways having outer end openings that project outwardly from the clamps. Manifolds are secured to the mounting beams (10, 12) outwardly of the end openings in the piston rod end sections (20, 26). A detachable coupling connects ports in the manifold with the end openings in the piston rod end sections (20, 26). The piston cylinder drive unit (14) can be detached from the frame by first detaching the fluid couplings and then detaching the clamps which clamp the piston rod end sections (20, 26) to the mounting beams (10, 12).

10 Claims, 22 Drawing Sheets

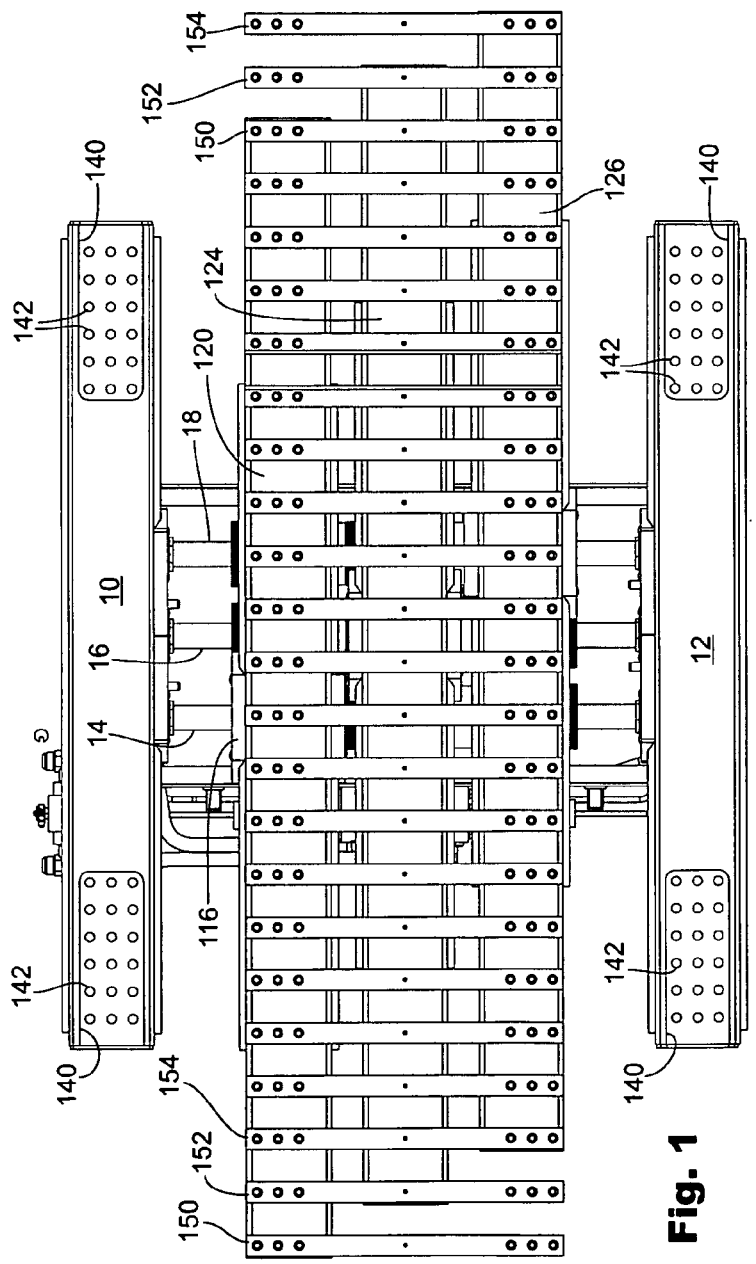
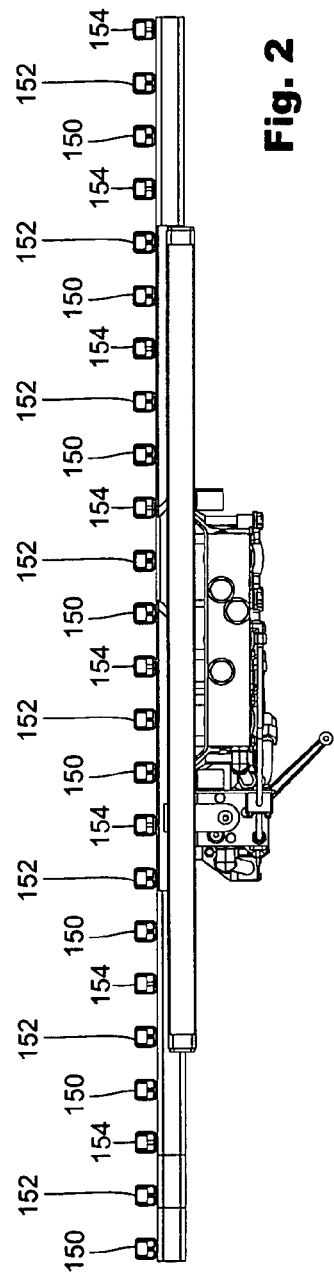

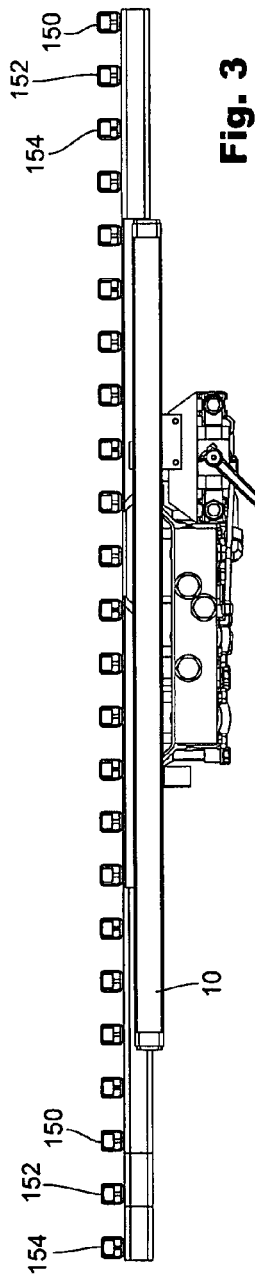
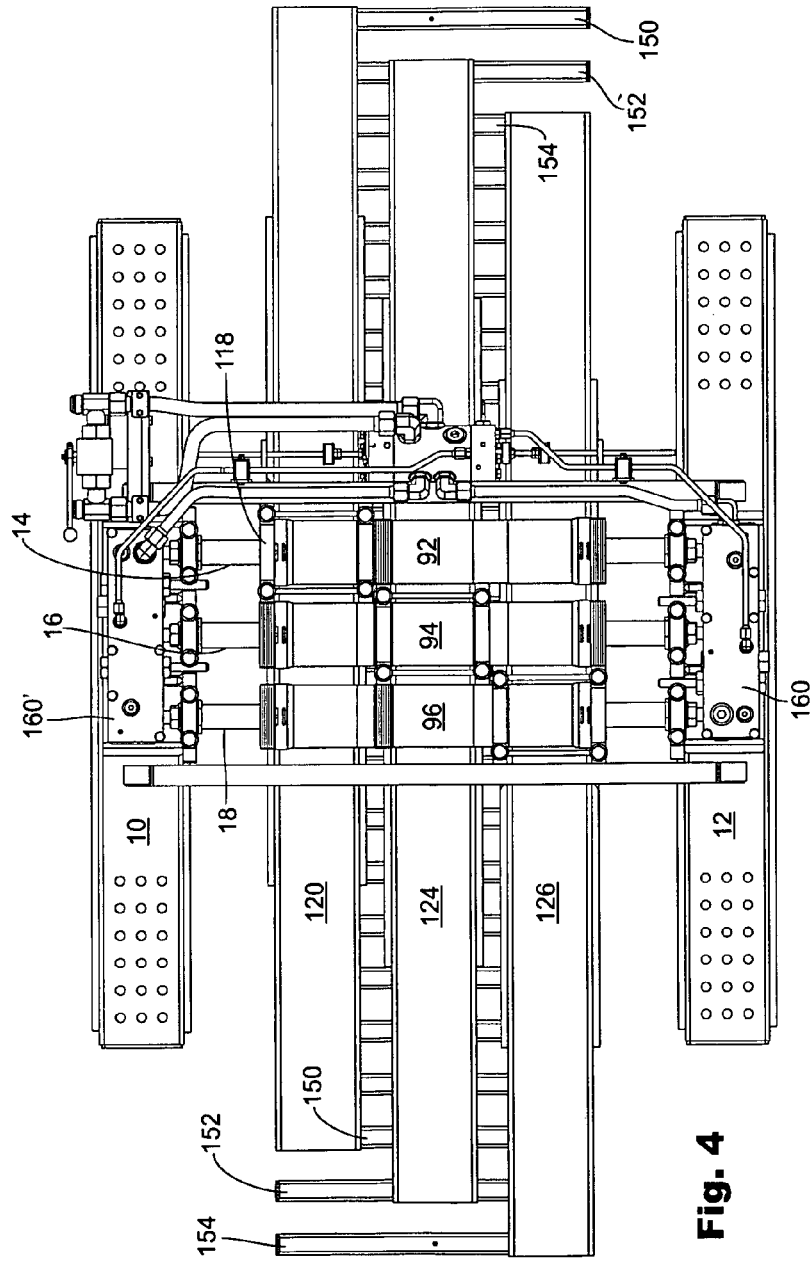

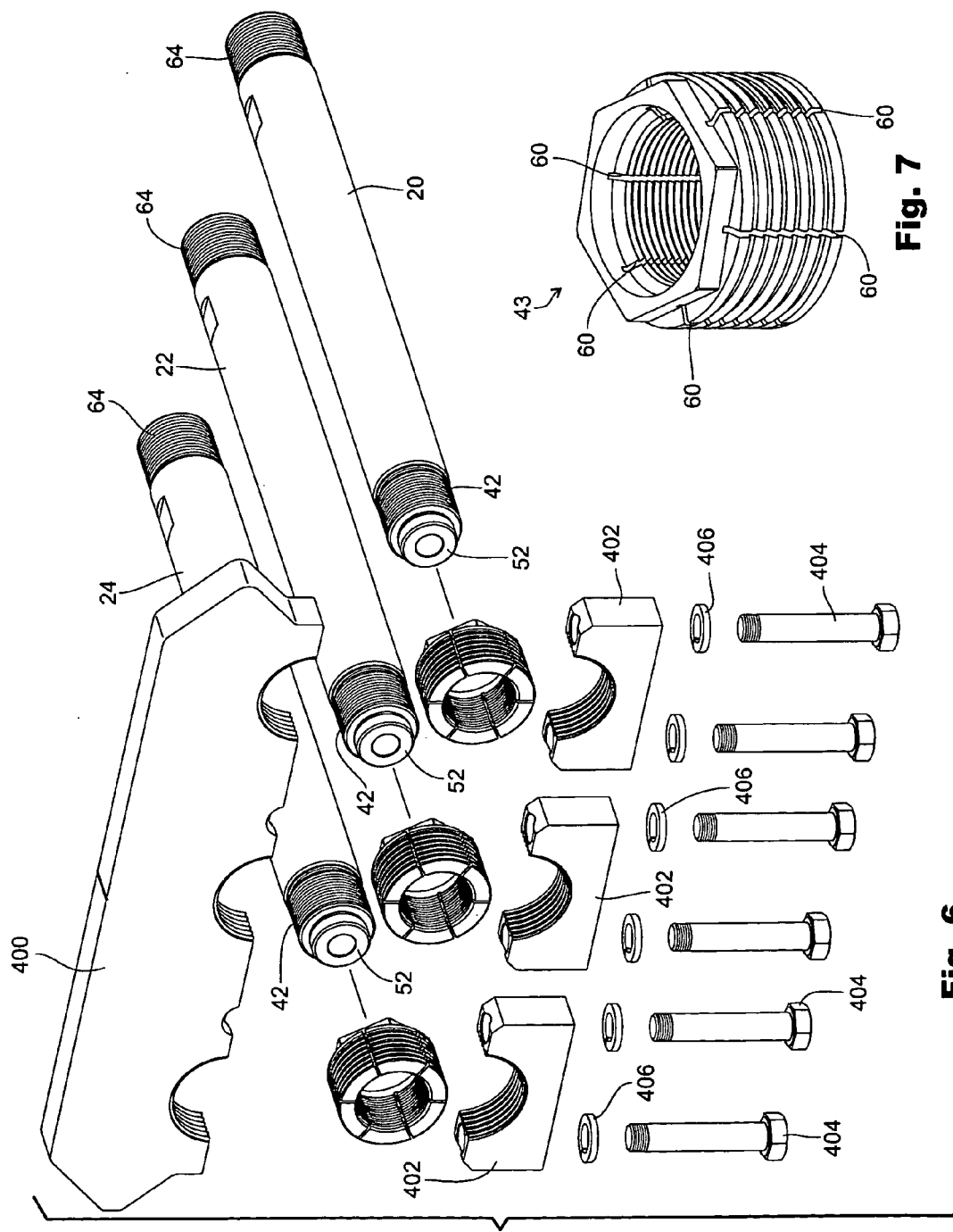

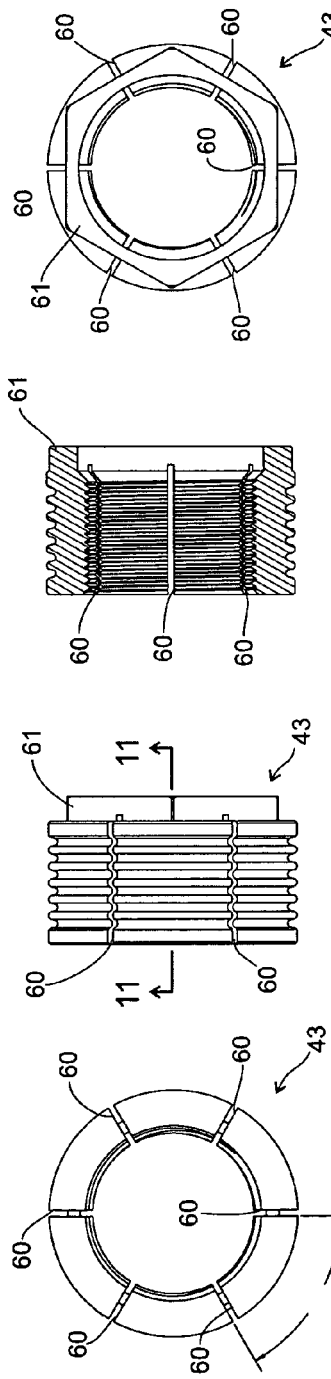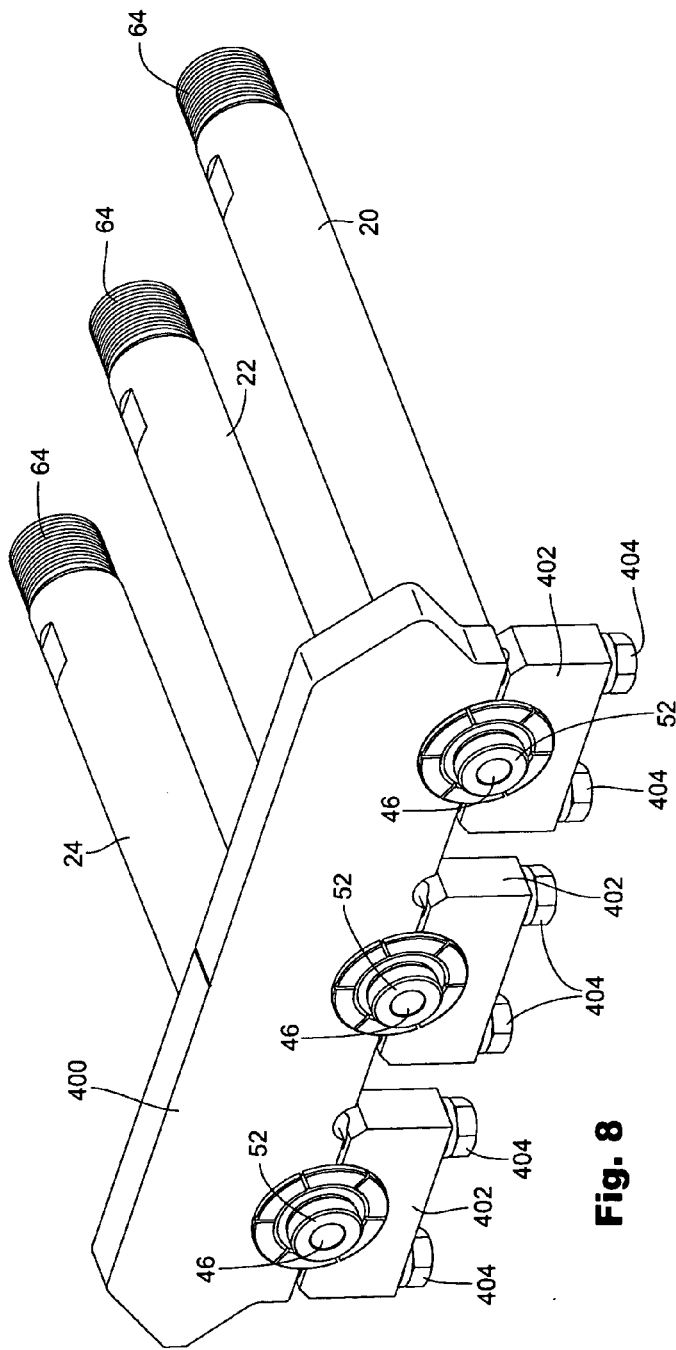

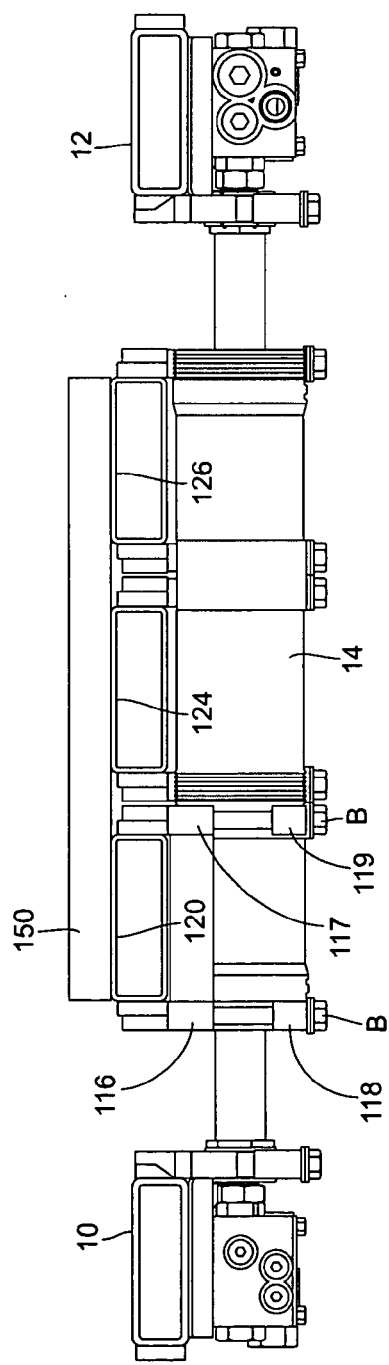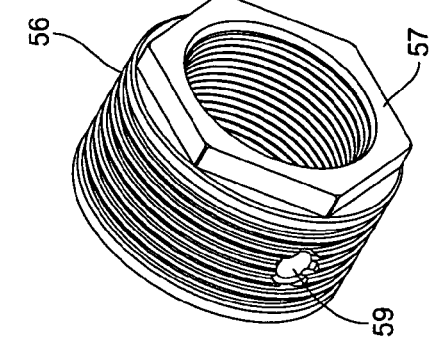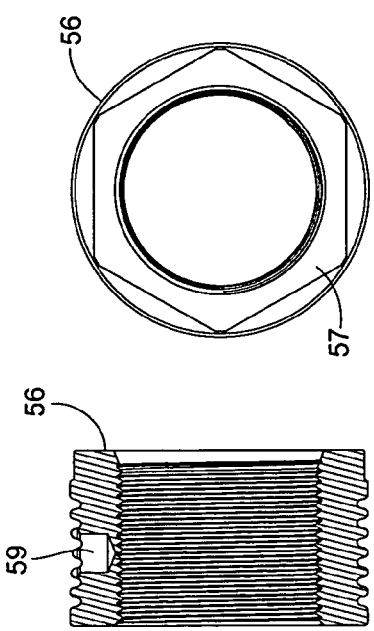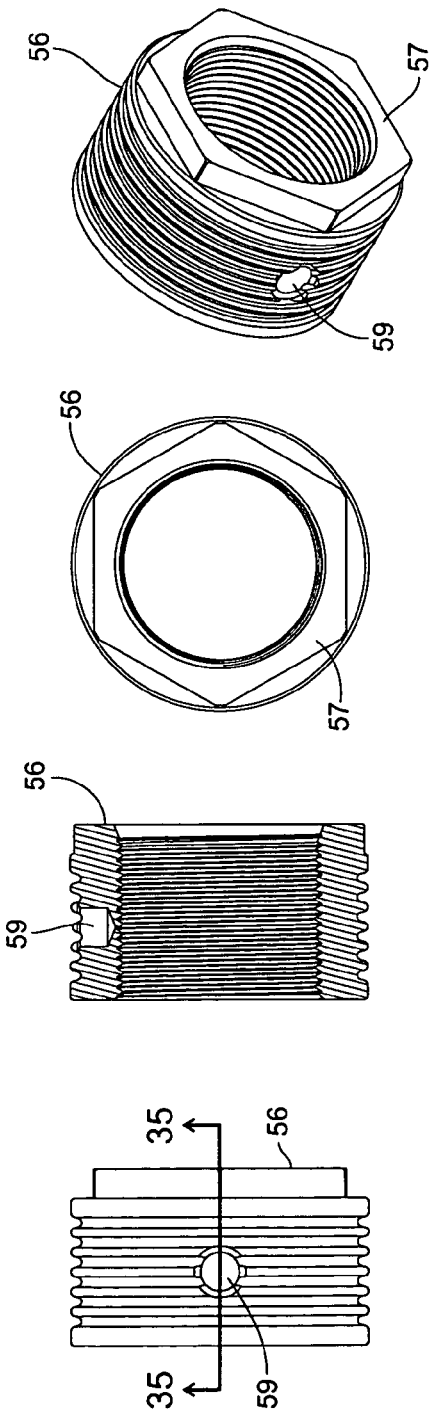

DRIVE/FRAME ASSEMBLY FOR A RECIPROCATING SLAT CONVEYOR

RELATED APPLICATION

This is a continuation-in-part application of Ser. No. 11/903,765, filed Sep. 24, 2007, now abandoned and entitled Drive/Frame Assembly For A Reciprocating Slat Conveyor.

TECHNICAL FIELD

This invention relates to improvements in reciprocating slat conveyors and, in particular, to the provision of an improved drive/frame assembly for a reciprocating slat conveyor.

BACKGROUND OF THE INVENTION

The present invention is an improvement on the drive/frame assemblies that are disclosed by U.S. Pat. No. 4,793,469, granted Dec. 27, 1988, to Raymond K. Foster, and entitled Reduced Size Drive/Frame Assembly For A Reciprocating Floor Conveyor; and by U.S. Pat. No. 4,748,893, granted Jun. 7, 1988, to Raymond Keith Foster, and entitled Drive/Frame Assembly For A Reciprocating Floor; and by U.S. Patent Pub. No. US2007-0045085 A1, published Mar. 1, 2007, based on an application filed by Raymond Keith Foster and entitled Reciprocating Slat Conveyor.

Each of the above three patent documents discloses a drive assembly having fixed piston rods and piston heads and movable cylinder barrels to which transverse drive beams are connected. The piston rods are clamped at their outer ends to transverse mounting beams and transverse drive beams are clamped to the movable cylinders. Conveyor slats are connected to the drive beams. This has proven to be an advantageous way of constructing the drive assembly and adapting it for mounting in an installation.

There is a need for simplifying the construction of the drive/frame assembly both in terms of reducing the total number of parts and the number of kinds of parts without sacrifice in the power transmitted by the hydraulic drive units to the transverse drive beams and the conveyor slats. A principal object of the present invention is to fulfill this need.

It is an object of the invention to construct a hydraulic drive unit that is powerful and at the same time is relatively small in size and is constructed from a maximum number of common parts and a minimum number of different parts. The drive/frame assembly has been simplified and made easier to manufacture, assembly and disassemble.

BRIEF SUMMARY OF THE INVENTION

One aspect of the invention is to provide a transverse mounting beam having a first, fixed clamp part secured to a mounting beam. A removable second clamp part is used with the first clamp part to clamp an end portion of a piston rod to the mounting beam. The piston rod end portion includes a central fluid passageway having an end opening. A manifold is secured to the mounting beam outwardly of the end opening in the piston rod. The manifold includes an inlet/outlet port confronting the end opening in the piston rod. A coupling is provided for detachably connecting the inlet/outlet port with the end opening in the piston rod.

According to an aspect of the invention, there is a manifold at each end of the drive assembly. Preferably, the manifolds are identical so that it is only necessary to construct one type of manifold and two of the same manifold can be used, one at each end of the drive assembly.

In preferred form, the inlet/outlet port includes a tube leading from a passageway in the manifold. The piston rod includes an externally threaded nipple at its outer end that projects outwardly beyond the fixed and removable clamp parts. The coupling is a sleeve on the tube having internal threads on its end confronting the threaded nipple. The sleeve is rotatable to engage its internal threads with the external threads on the nipple, for completing a fluid path from the fluid passageway in the manifold to the passageway in the end section of the piston rod.

In the preferred embodiment, the hydraulic drive unit comprises an elongated piston rod having first and second opposite ends and first and second opposite end sections. A central portion of the piston rod includes a piston head. An elongated cylinder barrel surrounds the piston rod and piston head and is movable axially back and forth along the piston rod and the piston head. The cylinder barrel has a first cylinder head at a first end and a second cylinder head at a second end. Each cylinder head includes an axial passageway through which an end section of the piston rod extends. A first working chamber is defined in the cylinder barrel axially between the first cylinder head and the piston head and a second working chamber is defined axially between the second cylinder head and the piston head. The piston rod includes a first axial passageway in its first end section extending from an outer end opening to at least one port in the piston head which connects the first passageway with the second working chamber. The second end section of the piston rod includes a second axial passageway that extends from an outer end opening to at least one port in the piston head which connects the second passageway with the first working chamber.

The preferred embodiment includes three side-by-side hydraulic drive units extending longitudinally of the conveyor and transversely of a pair of longitudinally spaced apart mounting beams. The piston rods have end sections that are removably connectable to the transverse mounting beams. Clamps are provided for removably connecting the end sections of the piston rod to the mounting beams. When the end sections of the piston rods are clamped to the mounting beams, externally threaded nipples extend outwardly from the ends of the piston rod end sections. A manifold is provided at each end of the drive assembly. The manifolds are connected to the mounting beams and each manifold has a port for each piston rod end section confronting the externally threaded nipple for the end section. A coupling is provided for detachably connecting each manifold port with an externally threaded nipple on a related piston rod end section. When the couplings are disconnected from the externally threaded nipples on the piston rod end sections, and the removable clamp parts are removed, the hydraulic piston units can be individually removed for service and/or replacement. Each manifold can be detached from the piston rod end sections and from fluid conduits leading to and from the manifolds, and then the manifolds can be individually removed, each from its transverse mounting beam, for servicing and/or replacement.

In preferred form, the opposite end portions of the hydraulic drive units are identical, the mounting beams are identical, the manifolds are identical and the cylinder barrels are identical. As a result, it is only necessary to manufacture one type of cylinder barrel, one type of piston end section, one type of transverse mounting beam, and one type of manifold.

Preferably, each transverse drive beam is provided with connectors for the conveyor slats which are identical except for where they are attached to the drive beams. When the three transverse drive beams are mounted on the three drive units, the connectors on the drive beams are all parallel and have fastener holes for the conveyor slats that are at a common location for all connectors. As a result, the conveyor slats can be pre-drilled at the same location on each slat to receive screw fasteners for connecting the slats to the slat connectors.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWINGS

Like reference numerals and letters refer to like parts throughout the several views of the drawing, and:

FIG. 1 is a top plan view of a drive assembly for a reciprocating slat conveyor;

FIG. 2 is an end view of the conveyor drive assembly shown by FIG. 1, looking towards the lower end of FIG. 1;

FIG. 3 is an end view looking towards the upper end of FIG. 4;

FIG. 4 is a bottom plan view of the drive assembly shown by FIGS. 1-3;

FIG. 6 is an exploded pictorial view of common end portions of the drive units, showing clamp parts for removably connecting outer ends of the piston rods to a mounting frame member;

FIG. 7 is a pictorial view of an adjustment sleeve connectable to an end portion of a piston rod for adjusting the position of piston rod connect to the clamp parts;

FIG. 8 is an assembled view of the structure shown by FIG. 6;

FIG. 9 is an end view of the adjustment sleeve shown by FIGS. 7 and 10-12, looking towards the left end of FIG. 10;

FIG. 10 is a side view of the adjustment sleeve shown in FIGS. 7 and 11-12;

FIG. 11 is a sectional view taken substantially along line 11-11 of FIG. 10;

FIG. 12 is an end view of the adjustment sleeve shown by FIGS. 7 and 9-11, looking towards the right end of FIG. 10;

FIG. 33 is a side elevational view of the drive assemblies shown by FIGS. 1-4, such view looking towards the left side of FIG. 1;

FIG. 34 is a side elevational view of a stationary rod nut that goes onto the end of the drive unit opposite the end shown by FIG. 6;

FIG. 35 is a sectional view taken substantially along line 35-35 of FIG. 34;

FIG. 36 is an end view looking towards the right end of FIG. 34;

FIG. 37 is a pictorial view of the rod nut shown by FIGS. 34-36, such view being taken from above and looking towards the top, one side and the wrench flat end of the rod nut;

DETAILED DESCRIPTION OF THE ILLUSTRATED EMBODIMENT

Figure 5:
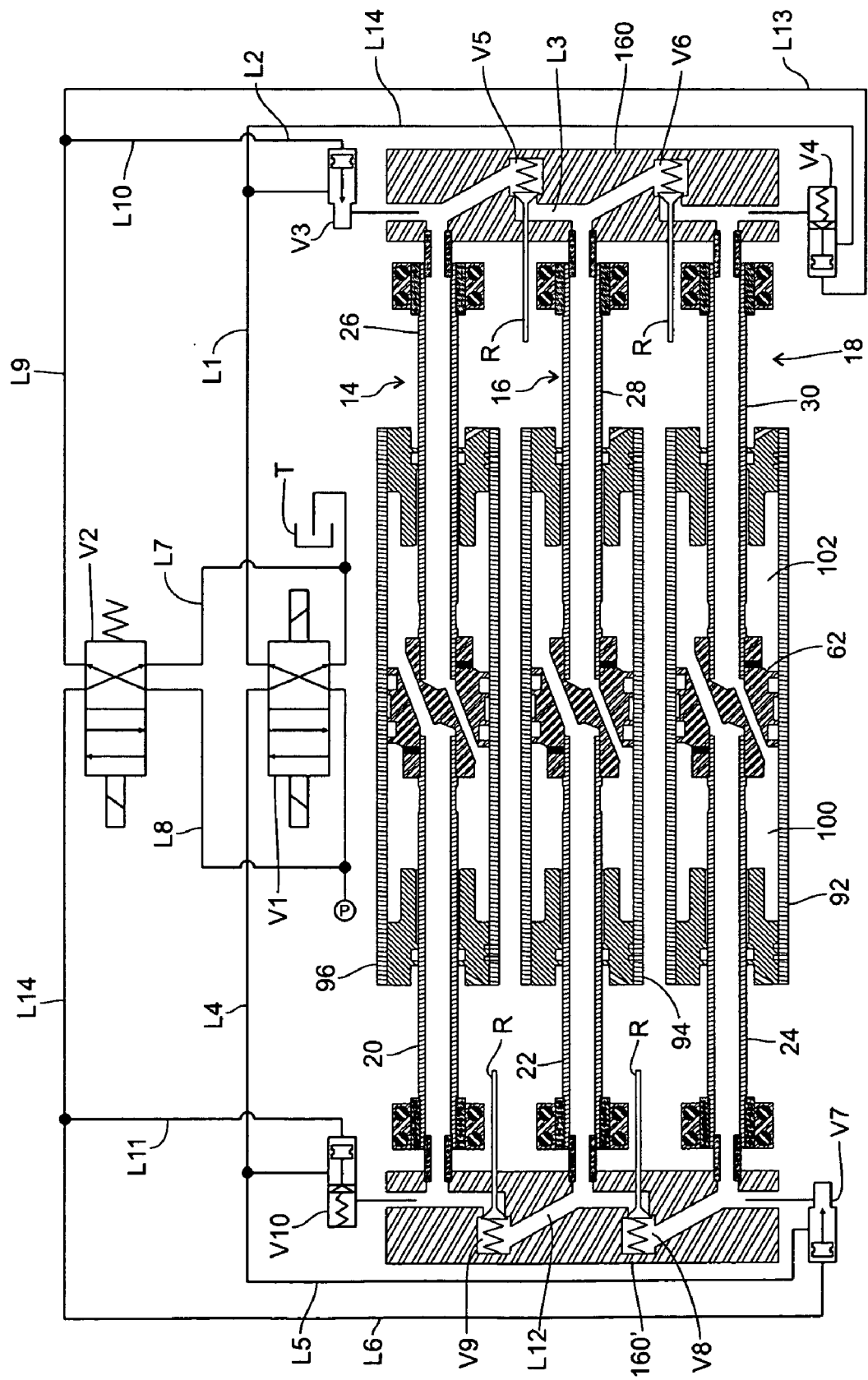
FIG. 5 is a schematic view of the hydraulic drive and control system for the drive assembly shown by FIGS. 1-4.

The drive assembly shown by 1-4 comprises a pair of transverse mounting beams 10, 12 and three piston/cylinder drive units 14, 16, 18 secured at their opposite ends to the mounting beams 10, 12. The drive units 14, 16, 18 are parallel to each other and they extend in the conveying direction. As best shown by FIG. 5, the drive units 14, 16, 18 each comprises a fixed piston rod and a traveling cylinder barrel on the piston rod. Each piston rod is formed in two end sections 20, 22, 24 and 26, 28, 30. The outer ends of the piston rod end sections 20, 22, 24 and 26, 28, 30 are secured to the mounting beams 10, 12 by upper and lower clamps. The inner ends of the piston rod sections 20, 22, 24 and 26, 28, 30 are connected to piston heads 32, 34, 36.

Figure 20:
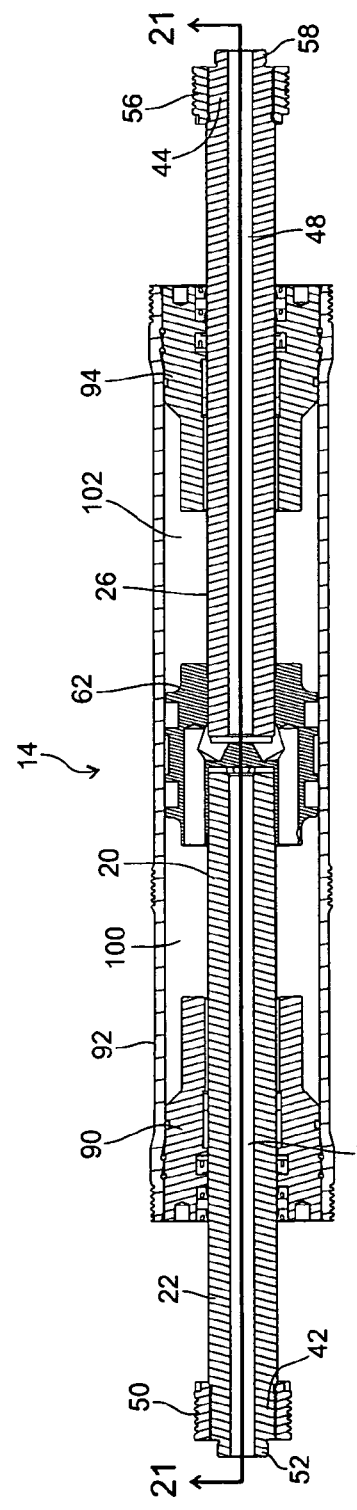
FIG. 20 is a longitudinal sectional view taken substantially along line 20-20 of FIG. 19.
Figure 21:
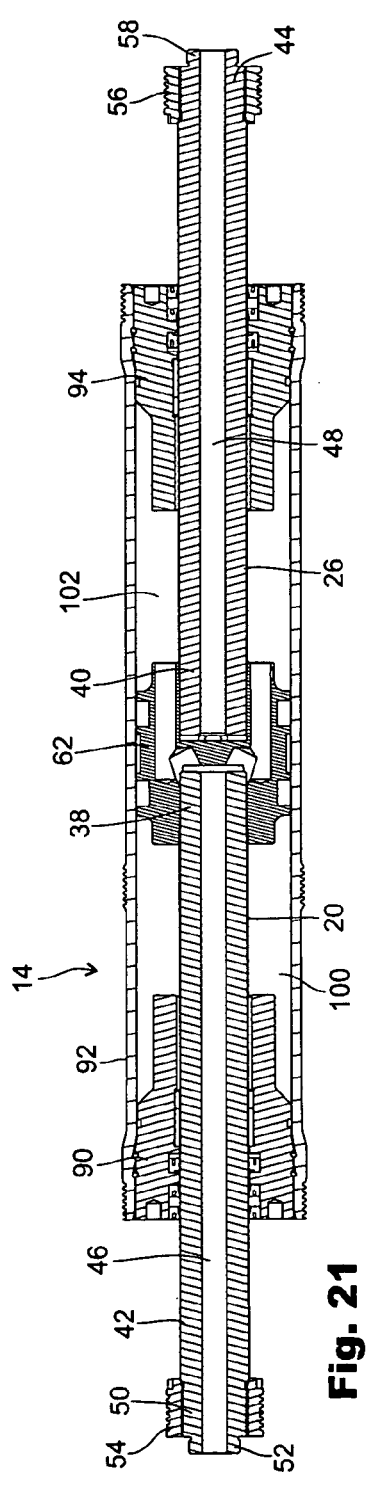
FIG. 21 is a longitudinal sectional view taken substantially along line 21-21 of FIG. 20.
Figure 22:
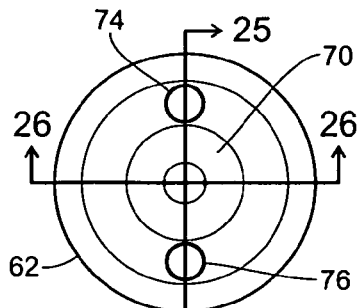
FIG. 22 is an end view of the piston head shown in FIGS. 20 and 21, such view being taken towards the left end of the piston head in FIG. 24.
Figure 23:
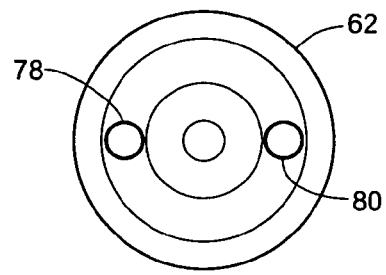
FIG. 23 is an end view of the piston head shown in FIGS. 20-22, such view being taken towards the right end of the piston head in FIG. 24.

FIGS. 19-26 illustrate drive unit 14. The other two drive units 16, 18 are identical in construction and so they will not be separately described. The description of drive unit 14 will serve as a description of all three drive units 14, 16, 18. As shown by FIGS. 20 and 21, the piston rod end sections 20, 26 for drive unit 14 have inner and outer end parts 38, 40 and 42, 44. End section 20 has a central passageway 46 extending throughout its entire length. End section 26 has a central passageway 48 extending throughout its entire length. The outer end part 42 has two sets of external threads. An adjustment sleeve 54 screws onto the larger threads 50. Part 52 is a nipple that is externally threaded for reasons to be hereinafter described. End part 44 on the opposite end of the drive unit 14 has two sets of external threads. One set is for an adjustment sleeve 56. The other set is on a threaded nipple 58. Sleeve 56 (FIGS. 34-37) is a solid sleeve and it screws onto the threaded part 44. The outer surface of sleeve 56 presents radially outwardly directed rings and grooves, similar to the rings and grooves shown on sleeve 54 (FIGS. 7, 10 and 11). Referring to FIGS. 7-12, the sleeve 54 has a solid ring section at one end and is axially split throughout the rest of its length. The splits 60 are separated by about 60° (FIG. 9). The splits 60 make it easier to rotate the sleeve 54 on the rod end part 50. The role of the sleeves 54, 56 will be described in some detail in a description below of the mounting and dismounting of the drive units 14, 16, 18 on the transverse support beams 10, 12. Also, the function of the threaded nipples at the ends of drive units 14, 16, 18 will also be described.

Figure 24:
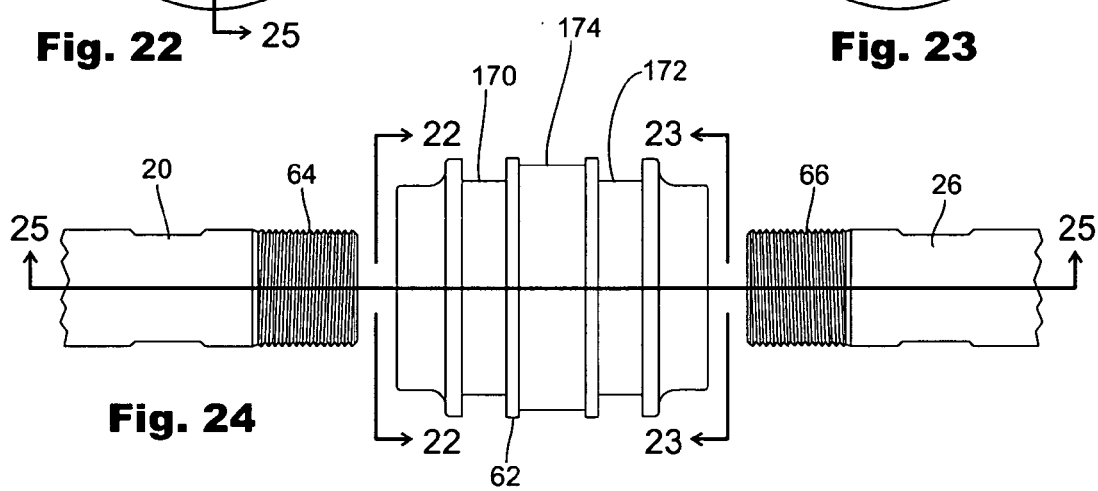
FIG. 24 is an exploded view of the piston head and fragmentary end portions of the piston rod sections that are in opposite sides of the piston head.
Figure 25:
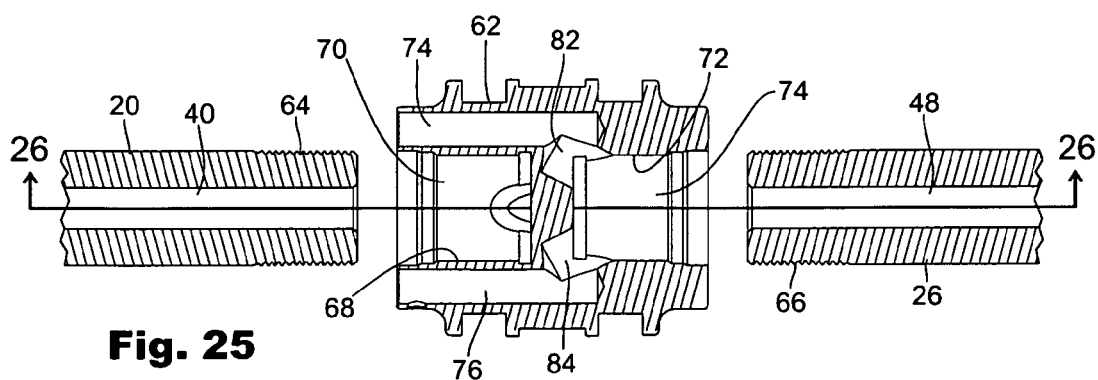
FIG. 25 is a longitudinal sectional view taken substantially along line 25-25 of FIG. 24 and line 25-25 of FIG. 22.
Figure 26:
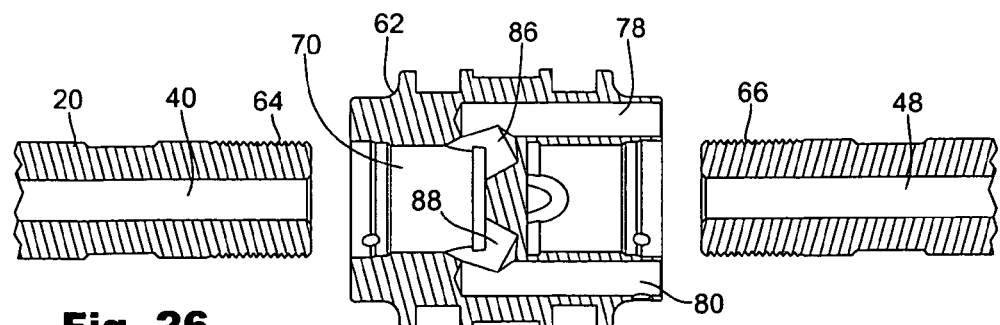
FIG. 26 is a longitudinal sectional view taken substantially along line 26-26 of FIG. 22 and line 26-26 of FIG. 25.

FIGS. 24-26 show a piston head 62 that is positioned between the two piston rod end sections 20, 26. The piston rod sections 20, 26 include end parts 64, 66 which are externally threaded. The threads on end part 64 mate with threads 68 in a first axial socket in the piston head 62. The threads on end part 66 mate with internal thread 72 in a second socket 74. As shown by FIG. 25, a first pair of axial passageways 74, 76 are formed in the left end portion of piston head 62 (as pictured in FIG. 24). These passageways 74, 76 are positioned 180° apart. A second pair of axial passageways 78, 80 are formed in the opposite end portion of the piston head 62, at positions 90° from passageways 74, 76. These passageways 78, 80 are shown in FIG. 26. Diagonal ports 82, 84 extend from socket 74 to passageways 74, 76. In like fashion, diagonal ports 86, 88 extend from socket 70 to passageways 78, 80. When the threaded end part 64 of piston rod portion 26 is screwed into the socket 74, the passageway 48 in piston rod section 26 is in communication with the passageways 74, 76 via the ports 82, 84. Also, when the threaded end part 64 of piston rod end section 20 is threaded into the socket 70, the passageway 40 in piston rod end portion 20 is in communication with the passageways 78, 80 via the ports 86, 88.

Drive unit 14 includes a cylinder head 90 at one end of a cylinder barrel 92 and a cylinder head 94 at the opposite end of the cylinder barrel 92. A first working chamber 100 is formed axially between cylinder head 90 and piston head 62. A second working chamber 102 is formed axially between piston head 62 and cylinder head 98. The passageway 46 in piston rod section 20 communicates with working chamber 102 via the ports 86, 88 and the passageways 78, 80. Passageway 48 in piston rod section 26 communicates with working chamber 100 via ports 82, 84 and passageways 74, 76. FIG. 5 shows another way of constructing the piston heads for connecting the piston rod passageways with the working chambers.

A preferred construction of the cylinder barrels 92 is shown by FIGS. 19-21 and 27-30. The finished cylinder barrels 92, 94, 96 of are an identical construction. Each has three patterns of rings and grooves 110, 112, 114 cut into its outer surface. Rings and grooves 110 are received within the semi-cylindrical recesses of upper and lower clamp parts 116 (FIG. 1), 118 (FIG. 4). The recesses of the clamp rings 116, 118 are provided with complementary rings and grooves which engage the rings and grooves 110 when they are installed. The upper clamp member is fixed. It is connected to a transverse drive beam 120, 124, 126 each of which extends across its drive unit 14, 16, 18. The second clamp member 118 is removable. After the drive unit 14, 16, 18 has been placed between the clamp members 116, 118, bolts are used to secure the two clamp parts 116, 118 together. This is clearly shown in the aforementioned U.S. Pat. No. 4,793,469. Here, the clamp parts 116, 118 clamp onto the rings and grooves 110. A second pair of upper and lower clamp parts 117, 119 (FIG. 33) clamp onto a smooth portion of the cylinder barrel, designated 122 in FIG. 19. Like the first pair of clamps 116, 118, the second pair of clamps 117, 119 have an upper fixed clamp part 117 that is secured to the drive beam 120 and a removal second clamp part 119 that is secured to the first clamp part 117 by use of bolts B.

Referring to FIGS. 2 and 4, a second transverse drive beam 124 is connected to cylinder barrel 94 except that the clamp parts with the rings and grooves engage rings and grooves 112 on the cylinder barrel 94. The second pair of upper and lower clamps engages a smooth region of cylinder barrel 94. Referring again to FIGS. 1 and 4, a third transverse drive beam 126 is connected to the third cylinder barrel 96, also by a pair of upper and lower clamps with rings and grooves and a pair of upper and lower clamps that are smooth. The clamp parts with rings and grooves engage the pattern of rings and grooves 114 on the cylinder barrel 96. The smooth pair of clamp members engage a smooth portion of the cylinder barrel that is axially inwardly from the rings and grooves 114.

Figure 27:
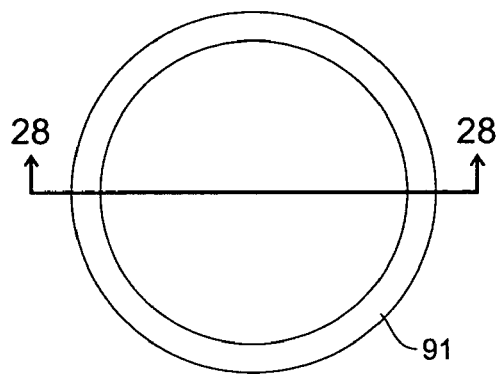
FIG. 27 is an end view of a cylinder barrel blank, such view looking towards the left end of FIG. 28.
Figure 30:
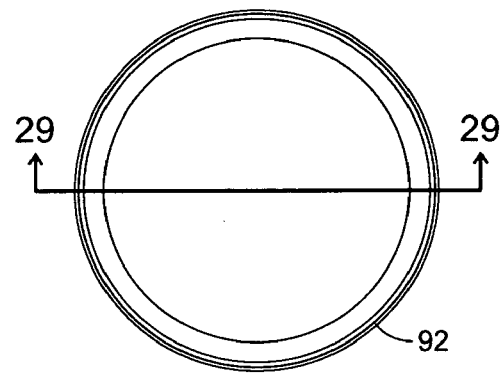
FIG. 30 is an end view of the cylinder barrel, such view looking towards the left end of FIG. 29.
Figure 28:
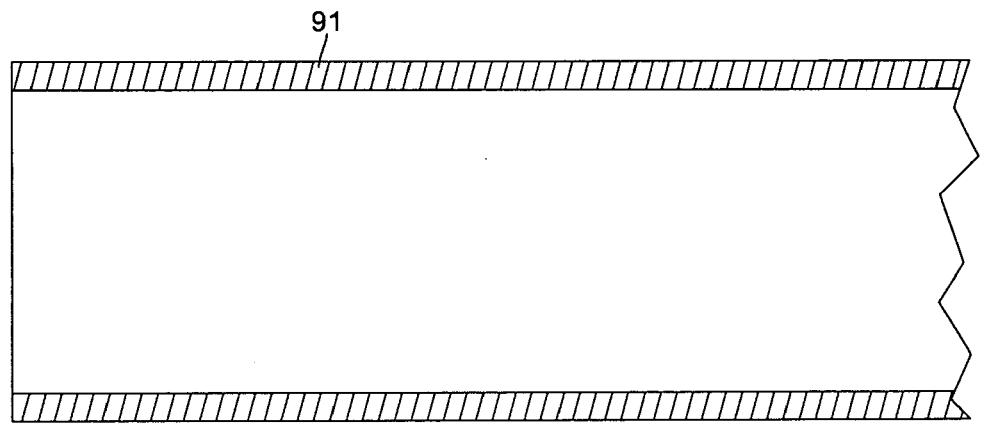
FIG. 28 is a fragmentary longitudinal sectional view of the cylinder blank shown by FIG. 27, taken substantially along line 28-28 of FIG. 27.

FIGS. 27 and 28 show a cylinder barrel blank 91. This blank 91 comes with a predetermined wall thickness. Then, the rings and grooves 110, 112, 114 are machined into the outer surface portion of the blank 91. Next, a region between rings and grooves 110, 114 is machined to reduce its outside diameter. Also, a region between rings and grooves 112, 114 is machined to reduce its outside diameter. Also, at both ends of the blank 91, the inside diameters of the end portions of the blank 91 are machined to both increase the internal diameter at those locations and provide an inwardly tapering receptacle at each end of the barrel for receiving the cylinder heads 90, 94. Thus, the machining provides the rings and grooves 110, 112, 114 and the inwardly tapering receptacles for the cylinder heads 90, 94. In addition, the wall thickness of a large portion of the blank 91 is reduced. The resulting structure 92, 94, 96 has less weight than the blank 91 but has more than adequate strength.

Figure 15:
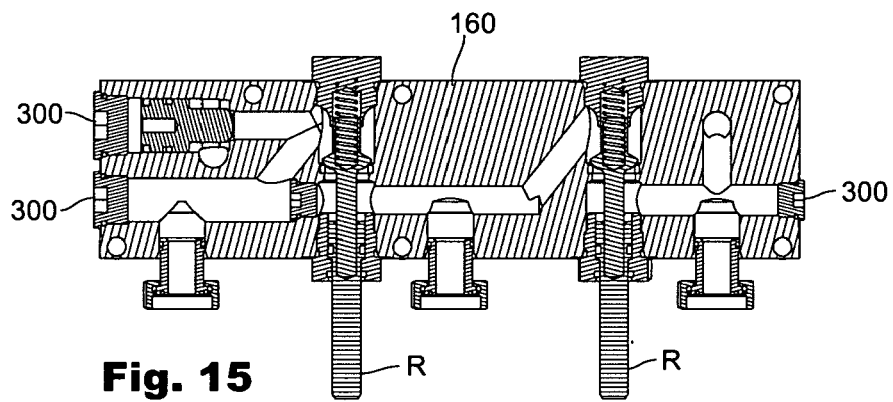
FIG. 15 is a sectional view taken substantially along 13, 15-13, 15 of FIG. 17.
Figure 16:
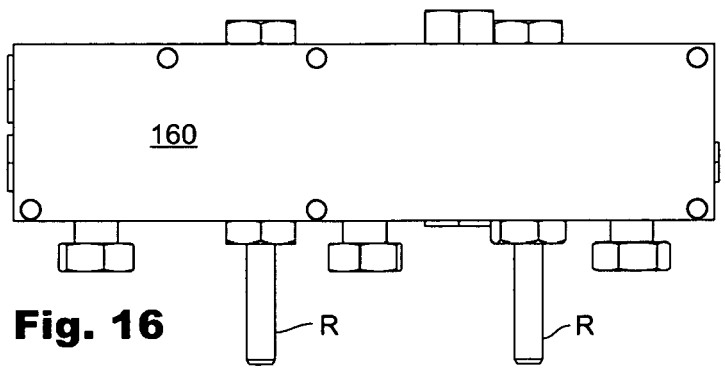
FIG. 16 is a plan view of the manifold shown by FIGS. 13-15, 17 and 18.
Figure 18:
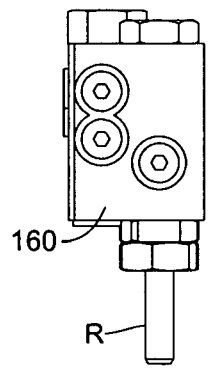
FIG. 18 is a side view of the manifold looking towards the right side of FIG. 16.
Figure 17:
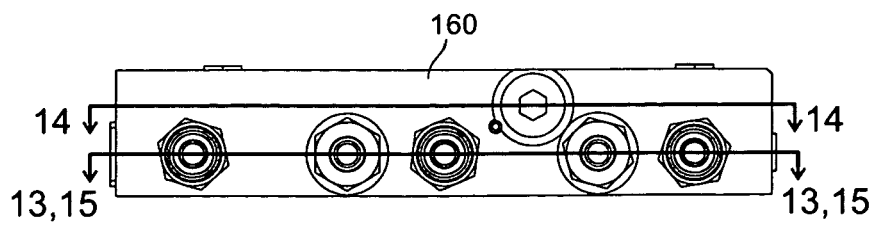
FIG. 17 is an end view of the manifold shown by FIGS. 13-16 and 18, such view looking towards the lower end of FIG. 16.
Figure 19:
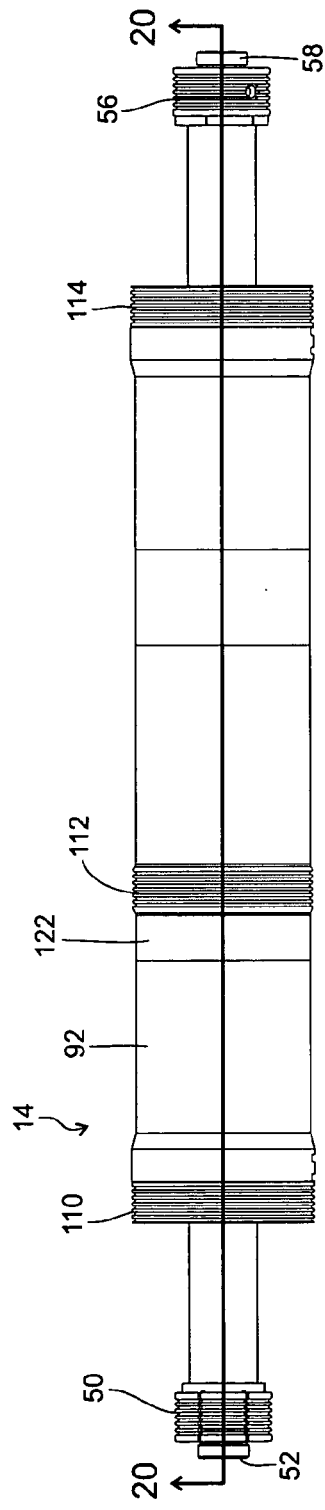
FIG. 19 is a side elevational view of a hydraulic drive unit.

In preferred form, the transverse mounting beams 10, 12 are constructed from tubular stock having a rectangular cross sectional shape. This same tubular material is commonly used for the drive beams 120, 124, 126 and may be used for that purpose in the subject drive assembly. An end view of the stock material is shown by FIG. 33 herein and by FIG. 15 of U.S. Pat. No. 4,793,469. Referring to FIG. 1, in the preferred embodiment, U-shaped openings 140 are cut in the top wall at the ends of the beam 10, 12. A pattern of openings, e.g. eighteen openings 142, are formed in the bottom wall of the beams 10, 12 in the region of the cutouts 140. These openings 142 are selectively used for bolting the end portions of the beams 10, 12 to longitudinal main frame beams in a trailer or stationary installation. FIG. 18 of U.S. Pat. No. 4,793,769 shows main frame beams MFB in the form of H-beams. They may also be in the form of channel beams or box beams. The cutouts 140 facilitate access to the bolt holes 142 that are being used for the bolts that connect the beams 10, 12 to the main frame beams MFB.

In a known manner, connector members for the conveyor slats are connected to the transverse drive beams 120, 124, 126. As shown by FIGS. 1 and 2, the connectors 150 are connected to drive beam 120. Connectors 152 are connected to drive beam 124. Connectors 154 are connected to drive beam 126. Preferably, the connectors 150, 152, 154 are of a length to give them at least three screw openings at each end. Lengthwise of the conveyor, the screw openings are at the same length location in each conveyor slat. As a result, like screw openings can be provided at the same location in the conveyor slats and then any given conveyor slat can be connected to any given drive beam 120, 124, 126.

The power and control system for the drive assembly has identical manifolds 160, 160' at each end of the drive assembly. The manifolds 160, 160' are mounted on the bottoms of the mounting beams 10, 12 outwardly adjacent the openings in the outer ends of the piston rod sections 20, 22, 24 at one end of each drive unit 14, 16, 18 and 26, 28, 30 at the opposite end of each drive unit 14, 16, 18.

Figure 29:
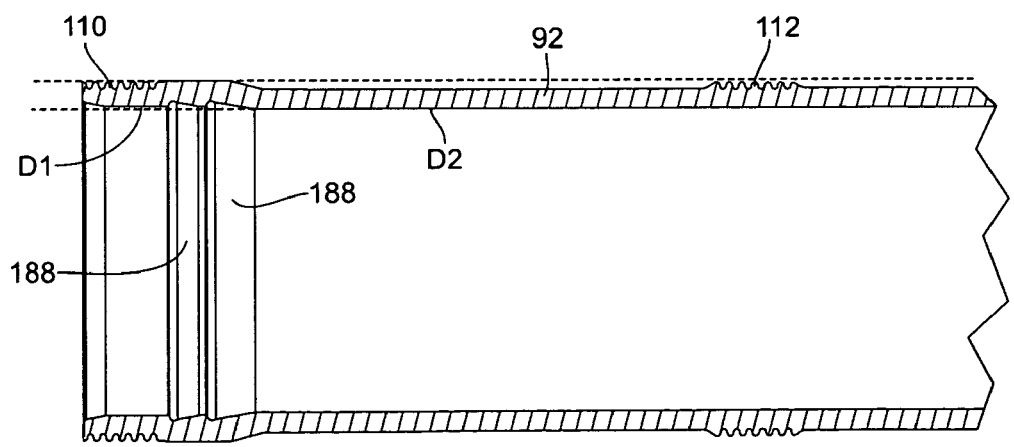
FIG. 29 is a fragmentary longitudinal view of the cylinder barrel blank after it has been machined to form the cylinder barrel.
Figure 32:
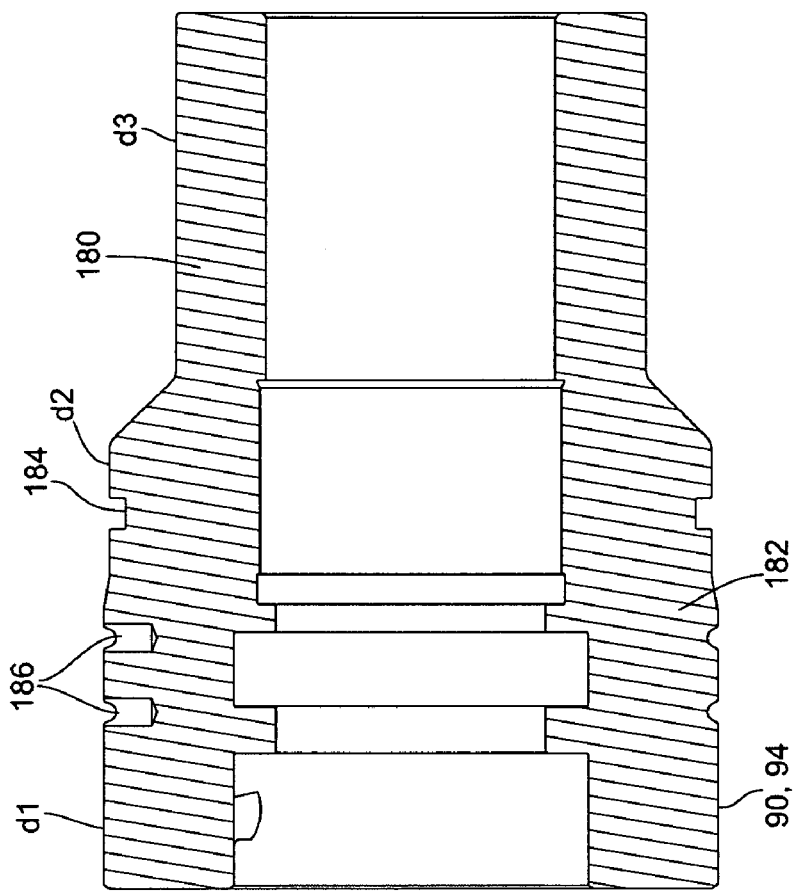
FIG. 32 is a longitudinal sectional view of the cylinder head shown by FIG. 31, taken substantially along line 32-32 of FIG. 31.
Figure 31:
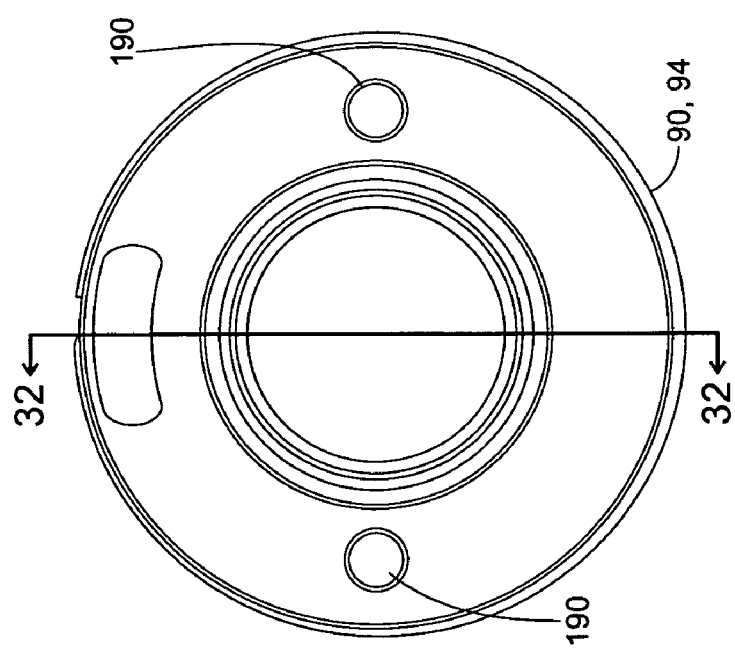
FIG. 31 is an outer end view of one of the cylinder heads, such view being taken towards the left end of FIG. 32.
Figure 38:
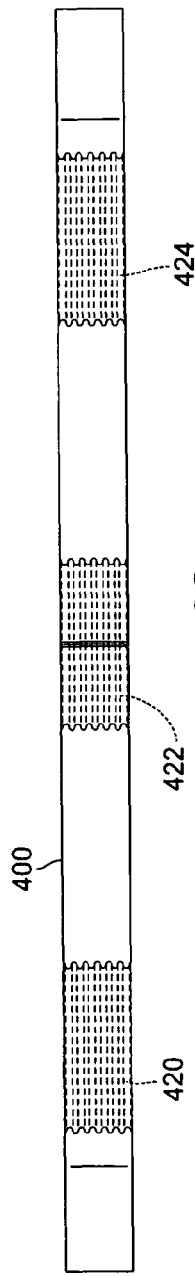
FIG. 38 is a top view of the fixed clamp part which is connected to the transverse mounting beam at each end of the drive assembly.
Figure 42:
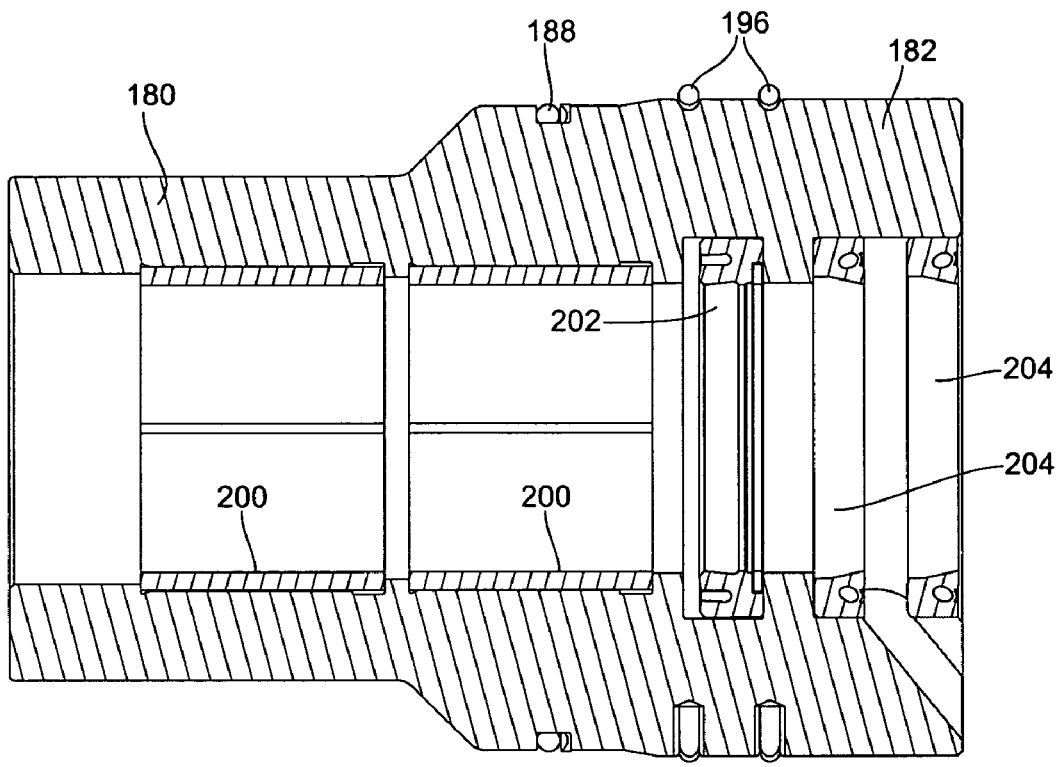
FIG. 42 is a longitudinal sectional view of a cylinder head showing a seal ring and two lock wire rings located in grooves formed in the outer surface of the large diameter end of the cylinder head, and further showing a bushing, a seal ring and two wipers in annular grooves formed in the center opening of the cylinder heads.
Figure 43:
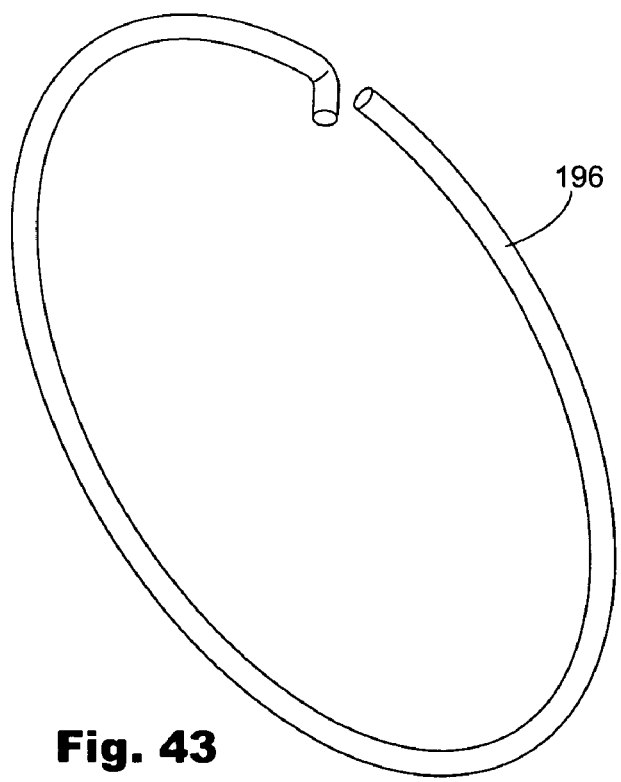
FIG. 43 is a pictorial view of one of the lock wire rings.

Referring to FIG. 24, the piston head 62 includes girth grooves 170, 172 which receive seal rings (not shown) and a girth groove 174 that receives a cylindrical bushing (not shown). The cylinder barrel blank 91 is machined to form regions of rings and grooves 110, 112, 114 on its outer surface and is machined at its ends to form end sockets for receiving the cylinder heads 90, 94. As shown by FIGS. 32 and 42, the cylinder heads 90, 94 each has an inner end portion 180 with a first diameter and an outer end portion 182 with a second larger diameter. The seal ring and lock wire ring grooves 184, 186 are formed in the larger diameter outer surface of the cylinder heads 90, 94. The seal rings 188 are inserted into the seal ring grooves 184 before the cylinder heads are slipped into the ends of the cylinder barrel 92. End pegs of an installation tool (not shown) are inserted into axial sockets 190 formed in the outer end of each cylinder head 90, 94. The tool is used for rotating the cylinder heads 90, 94 as they are being pushed into the end sockets in the cylinder barrel. After the piston heads 90, 94 are inside the sockets, the lock wire rings 196 are installed through radial openings in the cylinder barrel and are pushed into spaces formed by and between the lock wire ring grooves 186 and grooves 188 formed inside of the end portion of the cylinder barrel (FIG. 29). Before the cylinder heads 90, 94 are installed, they are fitted with a split ring bushing 200, a seal ring 202 and two wiper rings 204 (FIG. 42). The end sockets in the cylinder barrels taper slightly as they extend inwardly. The same taper is provided on the outer end portions 132 of the cylinder heads 90, 94. Accordingly, the cylinder heads 90, 94 can be pushed endwise into the ends of the cylinder barrels only a certain distance to a predetermined position and they cannot be pushed inwardly beyond that position.

The transverse drive beams 120, 124, 126 are connected to the cylinder barrels 14, 16, 18 by upper and lower clamp parts. The upper clamp parts are fixed to opposite side parts of the drive beams 120, 124, 126 in the manner disclosed by the aforementioned U.S. Pat. No. 4,793,469. The lower clamp parts are removable and are connected to the upper clamp parts by bolts, such as disclosed in U.S. Pat. No. 4,793,469. One pair of upper and lower clamps for each drive beam 120, 124, 126 includes recesses with rings and grooves that match one of the patterns of rings and grooves 110, 112, 114 on the external surface of the cylinder barrels 14, 16, 18. The second pair of clamp members for each drive beam 120, 124, 126 includes smooth recesses which engage at smooth region on the outer surface of its cylinder barrel. When the clamps are tightened, the rings and grooves on the cylinder barrel engage the rings and grooves on the upper clamp parts and this engagement prevents movement of the clamps lengthwise of the cylinder barrel 14, 16, 18.

As will be recognized by those skilled in the art, when valve V1 is in the position shown by FIG. 5, pressure from pump P is transmitted through valve V1 to line L1. Line L4 is connected by valve V1 to tank T. When valve V1 is in its second position, the pump P is connected to line L4 and line L1 is connected to tank T. When valve V2 is in the position shown by FIG. 5, the pump P is connected to line L9 which in turn is connected to lines L10 and L13. Line L6 and line L11 are connected to tank T via line L14 and valve V2. When valve V2 is in its second position, the pump P is connected to line L14 and line L9 is connected to tank T.

Valve V1 is a switching valve that switches at the end of each conveying stroke. By way of example, switching valve V1 may be the valve disclosed by U.S. Pat. No. 5,103,866, granted Apr. 14, 1992, to Raymond Keith Foster, and entitled Poppet Valve And Valve Assemblies. As is known by those skilled in the art, valve V2 is a directional control valve. When valve V2 is in one of its positions, the conveyor is operated to convey in a first direction. When valve V2 is shifted to its second position, the conveyor is operated to convey in the opposite direction. The operation of valve V2 is well described in the aforementioned Patent Publication US2007-0045085 A1.

Valves V5, V6, V8 and V9 are sequence valves. They are biased into a closed position by a spring and fluid pressure in a spring chamber. Valves V5, V6, V8, V9 include control rods R which are positioned to be contacted and depressed by ends of the cylinder barrels 92, 94, 96 moving into them. Specifically, the control rod R for valve V6 is contacted by one end of cylinder barrel 92. The control rod R for valve V5 is contacted by an adjacent end of the cylinder barrel 94. Control rod R for valve V8 is contacted by the opposite end of the cylinder barrel 94. Control rod R for valve V9 is contacted by the end of cylinder barrel 96.

Figure 50:
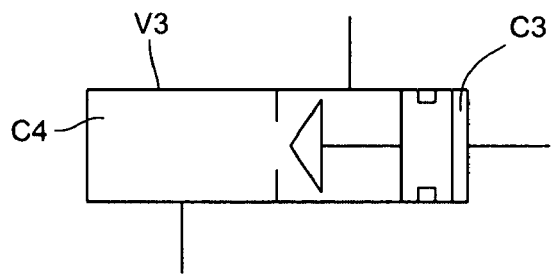
FIG. 50 is a view like FIGS. 46-49 of a third line pressure controlled valve in the system of FIG. 5, such view showing the valve in an open position.

When valve V3 is open (FIG. 50) pressure is connected to line L1. This pressure enters the passageway in piston rod end portion 26 and move onto working chamber 100 of drive unit 14. Pressure will be blocked by valve V5. Pressure will be connected by line L14, valve V4, piston rod end portion 30 and valve V6 to piston rod end portion 28. In response, the cylinder barrel will move towards mounting beam 10. When the conveyor is operated to move cylinder barrel 94 against the control rod R valve V5, valve V5 is opened and pressure from line L1 enters into the passageway in drive unit 16 and moves into the working chamber 100 for drive unit 16. Flow towards drive unit 18 is blocked by valve V6. However, when cylinder barrel 92 moves against the control rod R for valve V6, valve V6 is opened and pressure from line L1 moves into the passageway in piston rod end portion 30 and through the piston head into the working chamber 100 for drive unit 14.

When valve V1 is positioned to direct pressure into line L4, and valve V10 is open (FIG. 46), the pressure will move into the passageway in piston rod end portion 20 and through the piston head into the working chamber 102 for drive unit 14. The pressure will open valves V9 and V8 and move into the piston rod end portions 22, 24 of the drive units 16, 18, and onto the working chambers 34 for such drive units. As a result, all three drive units will move together in a first conveying direction and fluid will flow out from the working chambers 100 into the passageways in piston rod end portions 26, 28, 30 and into line L3 in manifold 160, and from line L3 into line L1 leading back to valve V1 which at this time is in a position connecting line L1 to tank T.

Manifolds 160, 160' are identical so it is only necessary to describe one of them. Accordingly, manifold 160 will now be described with reference to FIGS. 13-18. It will be understood that the description of manifold 160 will also be a description of manifold 160'. Manifold 160 is preferably formed from a one-piece block of metal or other suitable material. As clearly shown by FIGS. 13-15, ports and passageways are drilled in the block body. Some of them are closed by plugs 300. At the location of each plug 300, the passageway is threaded to receive threads on the plug 300. The block body is also drilled and threaded to receive and mount the valves V5, V6, V8, V9. Block Body is further drilled to receive valve V3 in manifold 160 and valve V7 in manifold 160'. A second passageway is provided in each manifold body and the valves V4, V10 are positioned in these passageways. In FIG. 14, this passageway in manifold 160 is designated L13 and valve V4 is shown. In the block body for valve 160', the passageway designation is L6 and the valve is L10.

Figure 13:
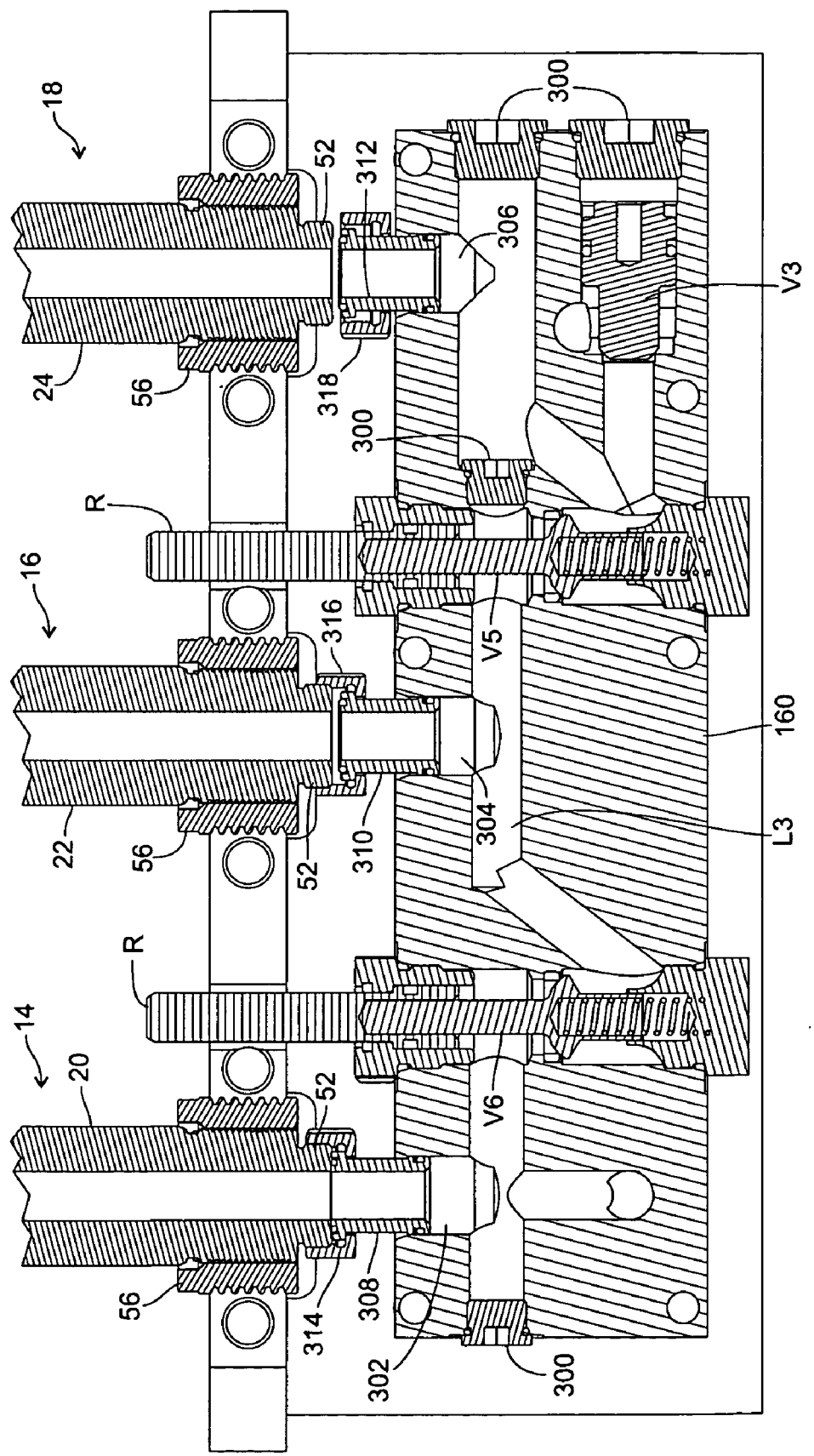
FIG. 13 is a sectional view taken substantially along line 13, 15-13, 15 of FIG. 17.
Figure 14:
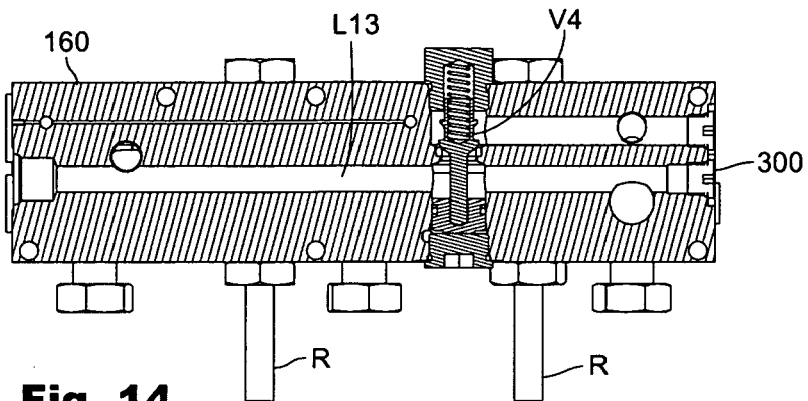
FIG. 14 is a sectional view taken substantially along line 14-14 of FIG. 17.

As shown by FIGS. 5 and 13-15, the passageways L3, L12 in the manifolds 160, 160' have ports for each of the passageways in the piston rod end portions 20, 22, 24 and 26, 28, 30. The ports for piston rod end portions 20, 22, 24 will now be described with reference to FIG. 13. Referring to FIG. 13, a hole is drilled in the block body at each location of a port 302, 304, 306. Short tubes 308, 310, 312 are positioned in the ports 302, 304, 306. Each tube 308, 310, 312 includes a girth groove in which a seal ring is placed. The seal ring seals between the tube 308, 310, 312 and the side walls of the ports 302, 304, 306. The outer end of each tube 308, 310, 312 preferably has a radially outwardly directed lip. Connector ring 314, 316, 318 have radially inwardly directed lips at one end which have openings at their center sized to receive the tubes 308, 310, 312. The connector rings 314, 316, 318 have internal threads at their ends opposite the lips. These threads are constructed to mate with external threads on the ends of the nipples 52. As best shown by FIG. 13, the passageways in the piston rod end sections 20, 22, 24, 26, 28, 30 have end openings that are contiguous the outer ends of the passageways in the tubes 308, 310, 312. In FIG. 13, connector ring 318 is shown retracted away from threaded nipple 52. Connector ring 316 is shown moved outwardly into the start of engagement with threaded nipple 52. Connector ring 314 is shown to be screwed onto the nipple 52 for moving the two radial flanges together and drawing the end openings in the piston rod end sections 20, 22, 24, 26, 28, 30 into sealed engagement with the outer ends of the tubes 308, 310, 312. The outer ends of the tubes 308, 310, 312 preferably includes an annular seal ring groove. When the connector rings 314, 316, 318 are tightened, the seal rings are moved against the end surfaces of the nipples 52.

The outer ends of the piston rod end sections 20, 22, 24, 26, 28, 30 are removably connectable by two-part clamps to the frame structure which includes the mounting frame members 10, 12. The first part is a fixed clamp part 400 that is welded or otherwise secured to the mounting beams 10, 12. The second part is a removable part 402 that is detachably connected to the fixed part 400 by the use of bolts 404 and lock rings 406, some of which are labeled in FIG. 6 of the drawing. As best shown by FIG. 13, the piston rod end sections 20, 22, 24, 26, 28, 30 are disconnected and clamped to the mounting beams 10, 12. When the connector rings 314, 316, 318 are retracted, the outer end surfaces of the nipples 52 are spaced from the confronting ends of the tubes 308, 310, 312. As a result, each drive unit 14, 16, 18 can be individually removed and installed from the mounting frame structure while the manifolds 160, 160' remain connected to the mounting beams 10, 12. Once the drive units 14, 16, 18 are clamped in place, the connector rings 314, 316, 318 can be manipulated to make a sealed connection between the manifold tubes 308, 310, 312 and the nipples 52. Also, each manifold 160, 160' can be individually removed from its mounting beam 10, 12 while the drive units 14, 16, 18 remain clamped to the mounting structure. Preferably, the manifolds 160, 160' are bolted to the mounting beams 10, 12 by bolts 161 which extend through bolt openings formed in the manifolds 160, 160' and screw into threaded openings provided on the mounting structure 10, 12.

Referring to FIGS. 6, 8 and 38-40, each fixed clamp member 400 has three circular recesses 420, 422, 424, one for each piston rod end portion 20, 22, 24, 26, 28, 30 at its end of the drive assembly. The recesses 420, 422, 424 are provided with parallel rings and grooves which match the rings and grooves on the members 43, 56. That is, the rings in the recesses 420, 422, 424 fit within the recesses on the members 43, 56. The rings on the members 43, 56 fit within the grooves formed in the recesses 420, 422, 424.

Figure 39:
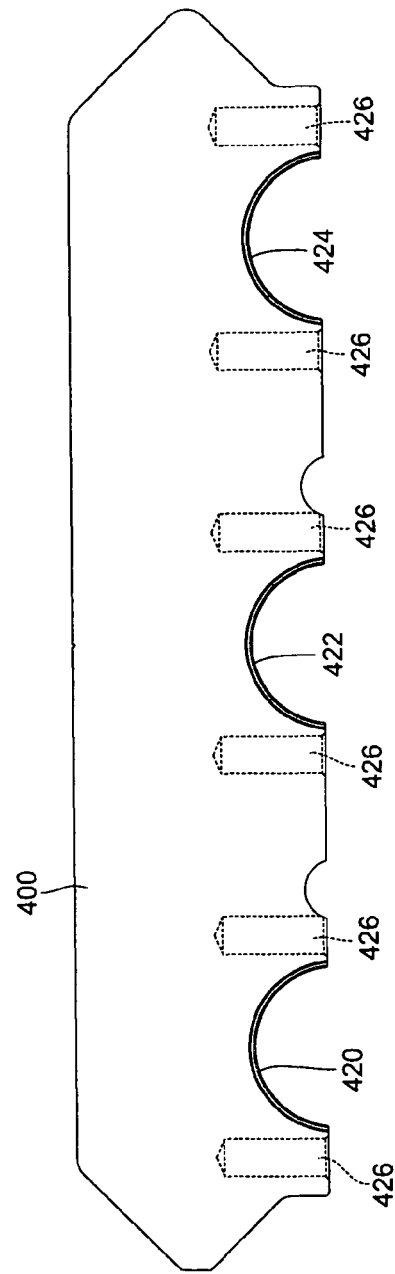
FIG. 39 is a side elevational view of the upper clamp member shown by FIGS. 6 and 38.
Figure 40:
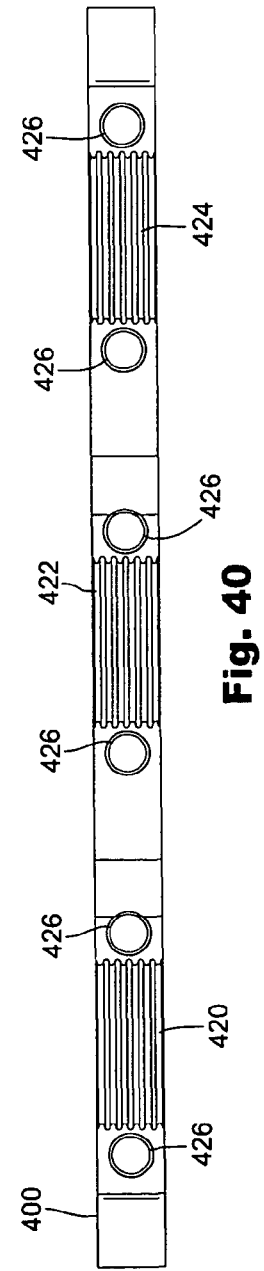
FIG. 40 is a bottom view looking upwardly towards the bottom of FIG. 39.
Figure 41:
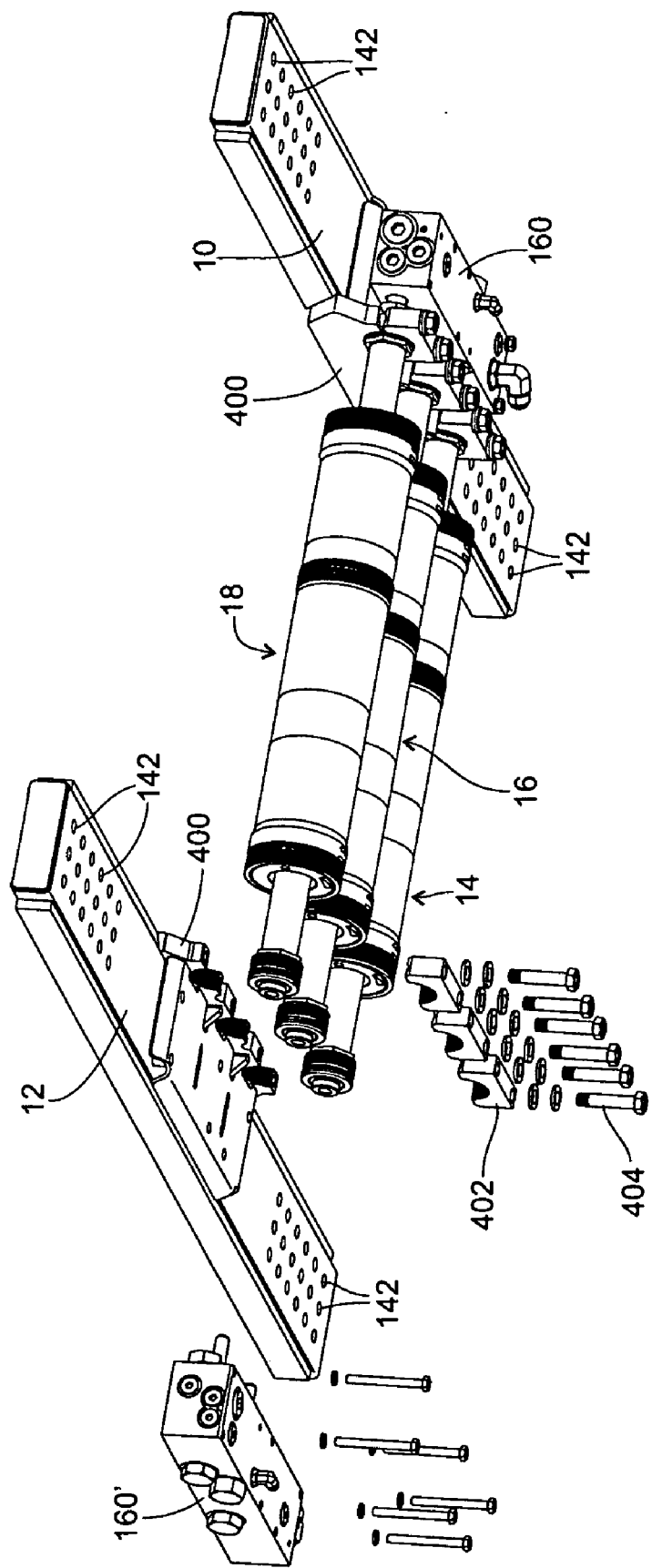
FIG. 41 is a pictorial view of the drive assembly shown by FIGS. 1-4, minus the transverse drive beams, the control valves and some fluid conduits, such view being taken from below and looking upwardly towards the bottom, one end and one side of the assembly, with some of the components at the left end of the assembly being exploded away from their installed positions.

As best shown by FIGS. 39 and 40, parallel bolt receiving openings 426 are provided on both sides of each recess 420, 422, 424. Openings 426 receive the bolts 404 that are used to connect the removable clamp members 402 to the fixed clamp member 400.

The mounting of the drive units 14, 16, 18 will now be described. Firstly, at a common end of the drive units 14, 16, 18, a collar 56 is screwed onto the threaded outer end portion of each piston rod end section 20, 22, 24. The collar 56 is rotated until its threads make tight engagement with the threads on the piston rod end section. Then, a set screw (not shown) may be applied to a set screw socket 59, for firmly connecting the collar 56 to the threaded outer end of its piston rod end sections 20, 22, 24. At the ends of the three drive assemblies 14, 16, 18, one of the collars 43 (FIGS. 7 and 9-12) is screwed onto the threaded end portion 42 of each piston rod end sections 26, 28, 30. After the collars 56 are installed, the collars 56 are placed into the recesses 420, 422, 424, with the rings on the collars 56 in the grooves in the recesses 420, and with the rings in the recesses 420, 422, 424 within the grooves in the collars 56. When the collars 56 are properly positioned relative to the recesses 420, 422, 424, the collars 43 at the opposite ends of the drive units 14, 16, 18 are rotated to the extent necessary to align their rings with the receiving grooves in the recesses 420, 422, 424 at that end of the drive assembly. Then, the ends of the drive units 14, 16, 18 are swung towards the collars 43 to place the rings on the collars 43 into the receiving grooves in the recesses 420, 422, 424. Next, the removable clamp parts 402 at that end of the assembly are placed on the lower portions of the collars 43 and bolts 404 are installed for connecting the clamp parts 402 to the clamp part 400.

As will be appreciated, there is a interlock provided between the ends of the drive units 14, 16, 18 and the clamp parts due to the rings on the collars 43, 56 with the grooves on the recesses 420, 422, 424 and the meshing of the rings in the recesses 420, 422, 424 with the grooves on the collars 43, 56. Once the drive units 14, 16, 18 are in place, and the clamp parts are installed, and the bolts 404 are tightened, the drive units 14, 16, 18 are rigidly attached to the mounting beams 10, 12. The meshing of the rings and grooves at the ends of the drive units 14, 16, 18 prevent endwise movement of the drive units 14, 16, 18 relative to the frame structure 10, 12.

In one embodiment of the invention, the drive units 14, 16, 18 constitute longitudinal frame members that interconnect the mounting beams 10, 12. In another embodiment, separate longitudinal frame members (not shown) are provided outwardly of the two outside drive units 14, 16, 18, as shown by the aforementioned U.S. Pat. No. 4,793,469. These longitudinal frame members are connected at their ends to the mounting beams 10, 12. In this embodiment, the rings and grooves need only be applied to one end of the drive units 14, 16, 18. The opposite end can be smooth and they may be held in place by smooth clamps, such as disclosed in U.S. Pat. No. 4,793,469.

Figure 44:
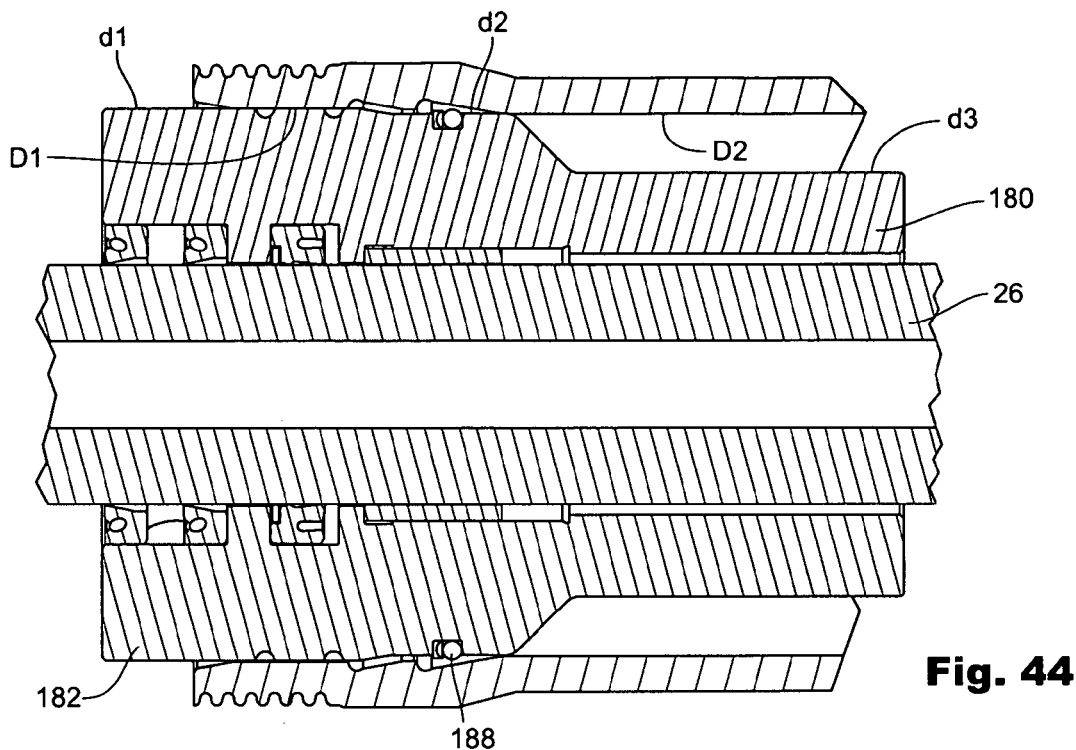
FIG. 44 is an enlarged scale fragmentary sectional view of an end portion of one of the drive units, showing a cylinder head in the process of being moved into the cylinder barrel.
Figure 45:
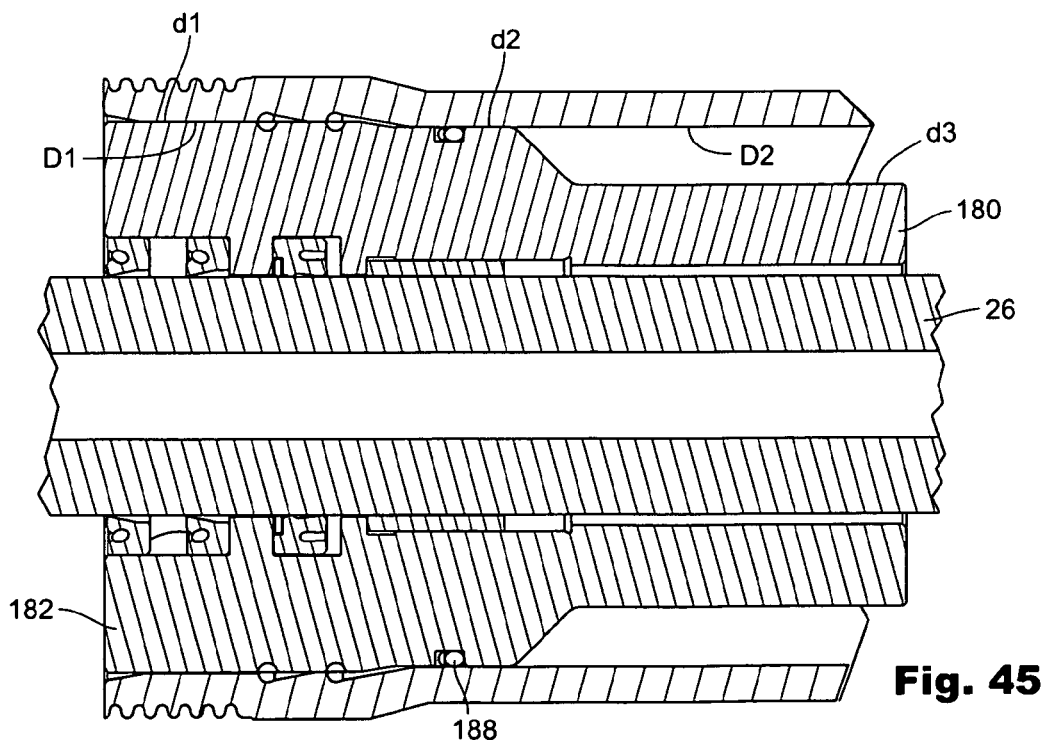
FIG. 45 is a view like FIG. 44, showing the cylinder head moved all the way into the end of the cylinder barrel.

Referring to FIGS. 44 and 45, each cylinder head 182 has three regions of outside diameter, d1, d2, d3. The ends of the cylinder barrels have two regions of inside diameter, D1, D2. The seal ring 188 is placed in the seal ring groove 184 (FIG. 32). Then, the cylinder head 182 is moved axially inwardly into its end of its cylinder barrel. The seal ring 188 does not contact any portion of the cylinder barrel until it is moved from diameter D1 to diameter D2. In this respect, compare FIGS. 44 and 45. FIG. 44 shows the seal ring 188 within a groove 184 just about to enter into the region of inside diameter D2. FIG. 45 shows cylinder head 182 moved further inwardly into the cylinder barrel and shows the seal ring 188 in contact with the inside diameter D2. When the cylinder head 182 is in the position shown by FIG. 5, a pair of lock rings 196 are installed into the lock ring grooves 188 and the complementary lock ring grooves formed in the end portion of the cylinder barrel radially outwardly from grooves 186.

Figure 46:
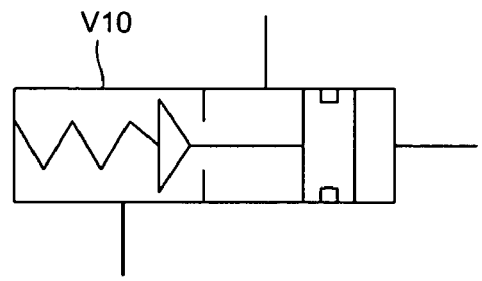
FIG. 46 is an enlarged scale of one of four line pressure responsive control valves shown in the system of FIG. 5 shown in an open position.
Figure 47:
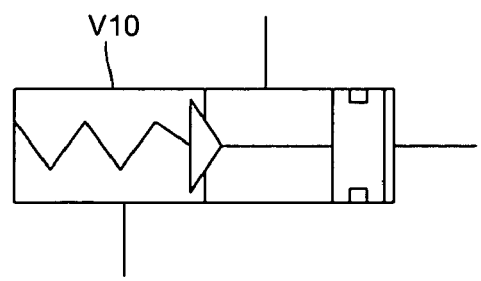
FIG. 47 is a second view of the valve shown in FIG. 46, showing the valve in a closed position.
Figure 48:
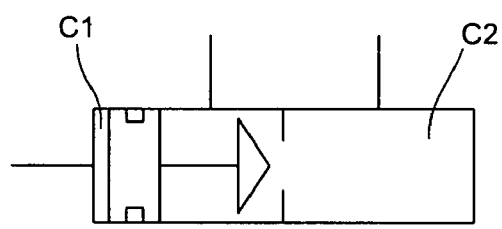
FIG. 48 a view like FIGS. 46 and 47 of a second line pressure responsive valve in the system of FIG. 5, such view showing the valve in an open position.
Figure 49:
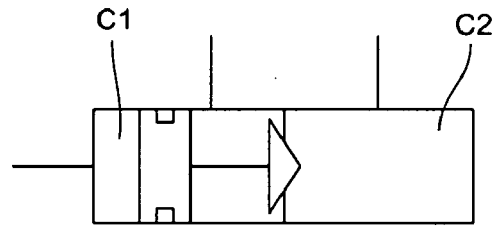
FIG. 49 is another view of the valve shown by FIG. 48, showing the valve in a closed position.

Referring to FIGS. 46-53, line pressure responsive valve V10 is shown in an open position in FIG. 46 and in a closed position in FIG. 47. It includes a spring that biases it into its closed position. Pressure applied to the valve plug opposite the spring will compress the spring and move the valve plug away from the valve seat, into the open position shown by FIG. 46. Line pressure responsive valve V7 is biased into a closed position by introducing pressure into chamber C1, behind a piston that is connected to the valve plug. When chamber C1 is connected to tank T, and pressure is connected to chamber C2, this pressure acts on the valve plug and moves it from its closed position shown by FIG. 49 into its open position shown by FIG. 48. Line pressure responsive valve V3 is constructed like valve V7. It includes chamber C3, C4. When chamber C3 is connected to pressure, the valve plug is moved into a closed position, shown by FIG. 51. When chamber C3 is connected to tank T, and chamber C4 is connected to pressure, the pressure acts on the valve plug and moves the valve plug away from its seat, into an open position shown by FIG. 50.

Valve V4 is like valve V10. It includes a spring that biases it into a closed position, shown by FIG. 53. When the spring chamber is connected to tank T, and the outer end of the piston that is connected to the valve plug is connected to pressure, the valve plug is moved into an open position, shown by FIG. 52.

Figure 51:
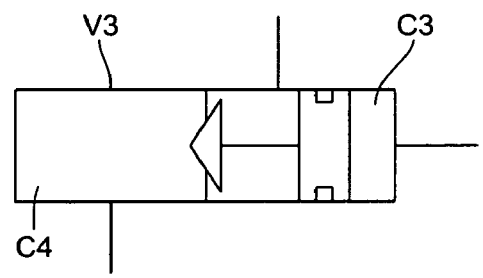
FIG. 51 is a view like FIG. 50, but showing the valve in a closed position.
Figure 52:
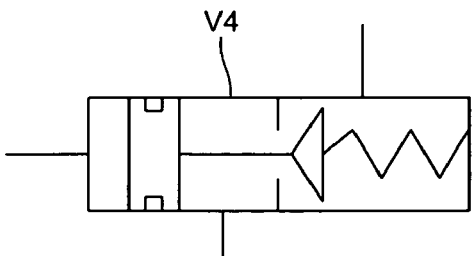
FIG. 52 is a view like FIGS. 46-51, showing a fourth line pressure responsive valve in the system for FIG. 5, such view showing the valve in an open position.
Figure 53:
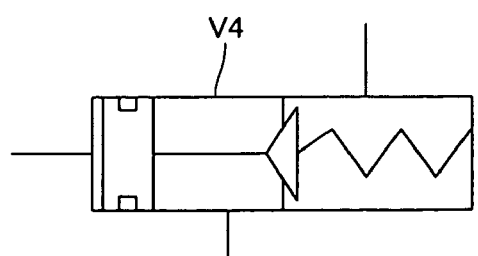
FIG. 53 is a view like FIG. 52, but showing the valve in a closed position.
Figure 54:
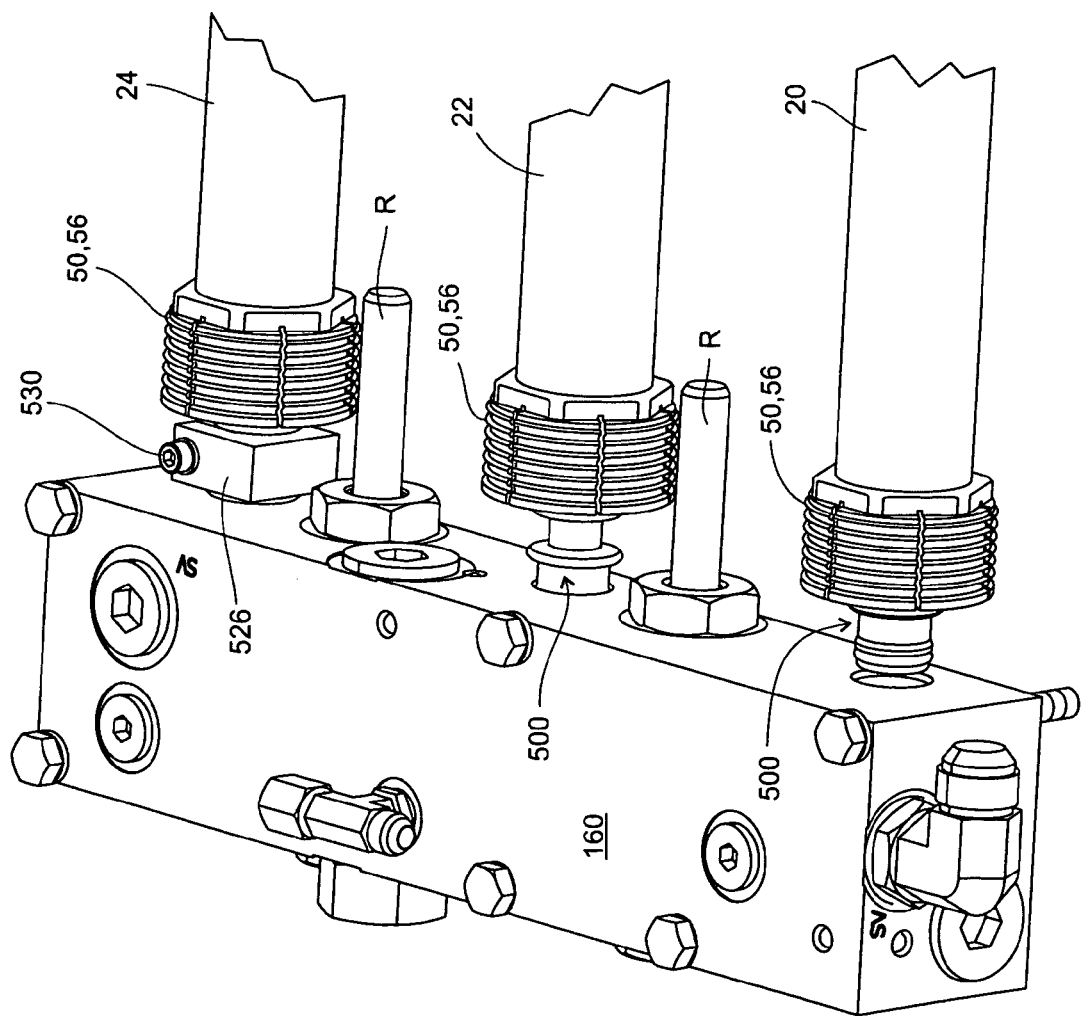
FIG. 54 is a fragmentary pictorial view showing piston rod end portions of the three jive units and the manifold at their end of the drive assembly, such view showing the upper piston rod end portion connected to the manifold, showing the center piston rod end portion in the process of being disconnected from the manifold, and showing the lower piston rod end portion disconnected from the manifold.

Referring now to FIGS. 5 and 46-53, when valves V1, V2 are in the positions illustrated, pressure from P will be communicated through valve V2 to line L9. Pressure from line L9 will enter line L10 and close valve V3 (FIG. 51). Pressure from line L9 will also move into line L13 and from line L13 into valve V4, moving the valve plug into valve V4 in its open position (FIG. 52). Pressure in line L1 is blocked by valve V3 but moves to and through open valve V4 to the passageway in piston rod end portion 30. From there it moves into working chamber 100 of drive unit 18. The pressure from valve V4 opens valve V6, and moves into the passageway in piston rod end portion 28. From there it moves into working chamber 100 of drive unit 16. The pressure from open valve V6 also flows to and opens valve V5, and moves through valve V5 into the passageway in piston rod end portion 26. From there, it moves into the working chamber 100 of drive unit 14.

At the opposite end of the drive assembly, valve V7 is open because line L6, line L14 and the path through valve V2 are connected to tank T. Valve V10 is closed because line L11, line L14 and a connected path through valve V2 are connected to tank T. Oil in chamber 102 of drive unit 18 is traveling through the passageway in piston rod end portion 24 and into and through valve V7. From there the oil moves through line L5, through line L4, and through a connected path in valve V1, to tank T. The oil is blocked by valve V8 from flowing through valve V8. Oil in chamber 102 of drive unit 16 moves through the passageway in piston rod end portion 22 to and through a valve V8, through valve V7, through line L5, through line L4 and through a connected path in valve V1, to tank T. The oil is blocked by valve V9 from flowing through valve V9. Oil in chamber 102 of drive unit 14 moves through the passageway in piston rod end portion 20, through valve V9, through valve V8, through valve V7, through line L5, through line L4, and through a connected path in valve V, to tank T. The oil is blocked by valve V10 from moving through valve V10. At this time, all drive units 14, 16, 18 are moving towards manifold 160'.

Referring to FIGS. 4 and 5, the traveling cylinder barrel 92 of drive unit 14 is attached to transverse cross drive 120. The traveling cylinder barrel 94 of drive unit 16 is attached to transverse drive beam 124. Cylinder barrel 96 of drive unit 18 is attached to transverse drive beam 126. When the three transverse drive beams 120, 124, 126 are being moved together from transverse mounting beam 12 towards transverse mounting beam 10, transverse drive beam 126 contacts transverse drive beam 124 and it in turn contacts cross drive 120. During movement, the contact of transverse drive beam 126 with transverse drive beam 124 imposes a load on drive unit 18. Similarly, the contact between transverse drive beam 124 and transverse drive beam 120 imposes a load on drive unit 16. There is no such load on drive unit 14 as transverse drive beam 120 is not in contact with another transverse drive beam in the direction of movement. Without valve V10 in the system, drive unit 14 would move faster than drive units 16, 18 and its transverse drive beam 120 and the conveyor slats attached to it would move faster than transverse drive beams 124, 126 and the conveyor slats attached to them. Such movement is not desirable and for that reason valve V10 has been added to the system. The presence of valve V10 in the closed position shown in FIG. 5, makes it necessary for the oil leaving drive unit 14 to push open valve V9 and then move through valve V8 before flowing to tank T. If valve V10 was not in the system, there would be a direct connection between the passageway in piston rod end portion 20 and line L4 leading back to tank T and as a result the drive unit 14 would move faster than drive units 16, 18, creating an undesirable uneven movement of the conveyor slats.

When valve V1 is switched, pressure from source P will be connected to line L4, line L5 and valve V10. Line L1, line L14 and valve V4 will be connected to tank T. Working chamber 102 in drive unit 14 will be connected to pressure via the passageway in piston rod end portion 20, valve V10, line L4 and a connected path through valve V1. This pressure will also open valve V9 and connect working chamber 102 in drive unit 16 to pressure via the passageway in piston rod end portion 22. Further, the pressure will open valve V8, so that the pressure will move through the passageway in piston rod end portion 24 into the working chamber 102 for drive unit 18. Valve V3 is connected to pressure via line L10 and this moves its valve plug into a closed position. Valve V4 is connected to pressure via line L14 and this moves the valve plug in valve V4 into an open position. The oil in working chamber 36 moves through the passageway in piston rod end portion 30 and moves through valve V4, then through line L14 and then through line L1, and then through a connected path in the valve V1 to tank T. Return oil flow from working chamber 100 in drive unit 16 is blocked by valve V6 until the moving component of drive unit 18 contacts the control rod R for valve V6 and mechanically moves the valve V6 into an open position. When this happens, oil flows out from the working chamber 100 in drive unit 16 through the passageway in piston rod end portion 26, then through valve V6, through valve V4, through line L14, through line L1, and then through the connector path in valve V1, on to tank T. While this is happening, valve V5 is closed and oil movement out of drive unit 14 is blocked. However, a moving component of drive unit 16 contacts the control rod R for valve V5, and mechanically moves valve V5 into an open position, oil in working chamber 100 for drive unit 14 will flow through the piston rod end portion 14, then through open valve V5 (V3 is closed), then through open valve V6, and then through valve V4, and then through line L14, and through line L1, through the connected path in valve V1 and onto tank T.

As known by persons skilled in the art, directional valve V2 will reverse pressure in return between lines L7, L8 and lines L9, L14. In the position illustrated, pressure in line L8 is connected by valve V2 to line L9. Line L14 is connected to line L7 which in turn is connected to tank T. When valve V2 is shifted into its second position, pressure in line L8 is connected to line L14. Line L9 is connected to line L7 which as mentioned is connected to tank T. As will be appreciated by persons skilled in the art, the system will operate in the above-described manner but with the direction of conveyor movement reversed. In the reverse direction operation the valve V4 provides the function of valve V10. It blocks flow from drive unit 18 to tank T via line L14 and line L1. The path through valve V4 is closed and the returning oil leaving drive unit 18 must move through valve V6, and then through valve V5, then through valve V3, and line L1, and through the connected path in valve V1 to tank T.

Figure 55:
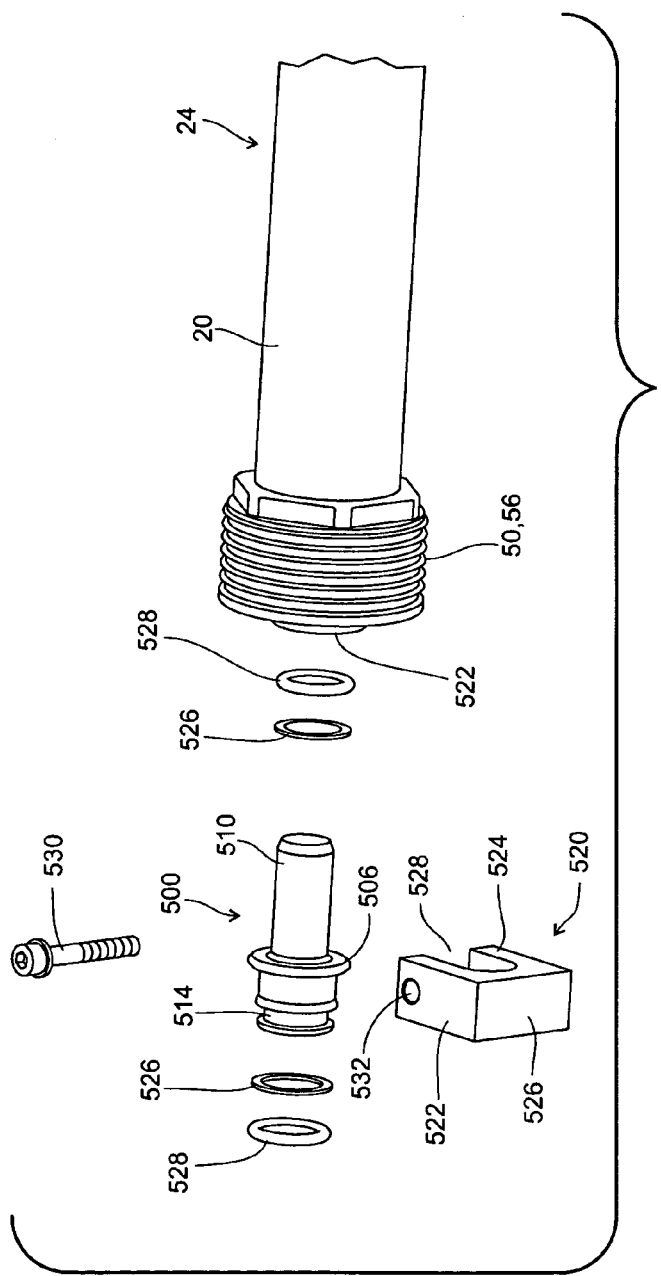
FIG. 55 is an exploded pictorial view of a piston rod end portion and the arch provided for connecting it to the manifold.

FIGS. 54-59 show a modified way of connecting the ports in the manifold 160 to the ports in the ends of the piston rod end portions 20, 22, 24. In this embodiment, the tubes 308, 310, 312 are replaced by tubular dowels 500, 502, 504. FIG. 55 shows the piston rod end portion 20 for drive unit 14. Piston rod end portion 20 is identical to piston rod end portions 22, 24. Also, tubular dowel 500 is identical to tubular dowels 502, 504. Accordingly, it is only necessary to describe the connection of piston rod end portion 20 to its port in the manifold because this description also applies to the other two drive units.

Figure 56:
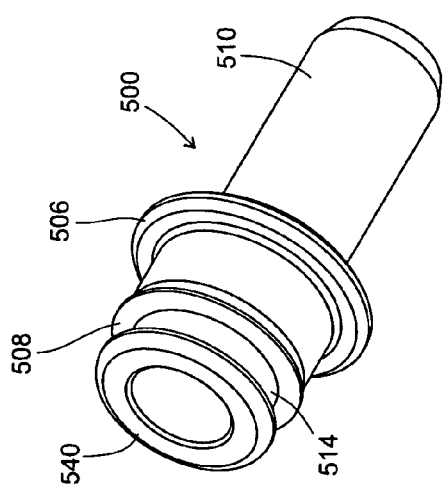
FIG. 56 is an enlarge scale pictorial view of a tubular dowel which connects at one end to the manifold and at the opposite end to the piston end portions.
Figure 58:
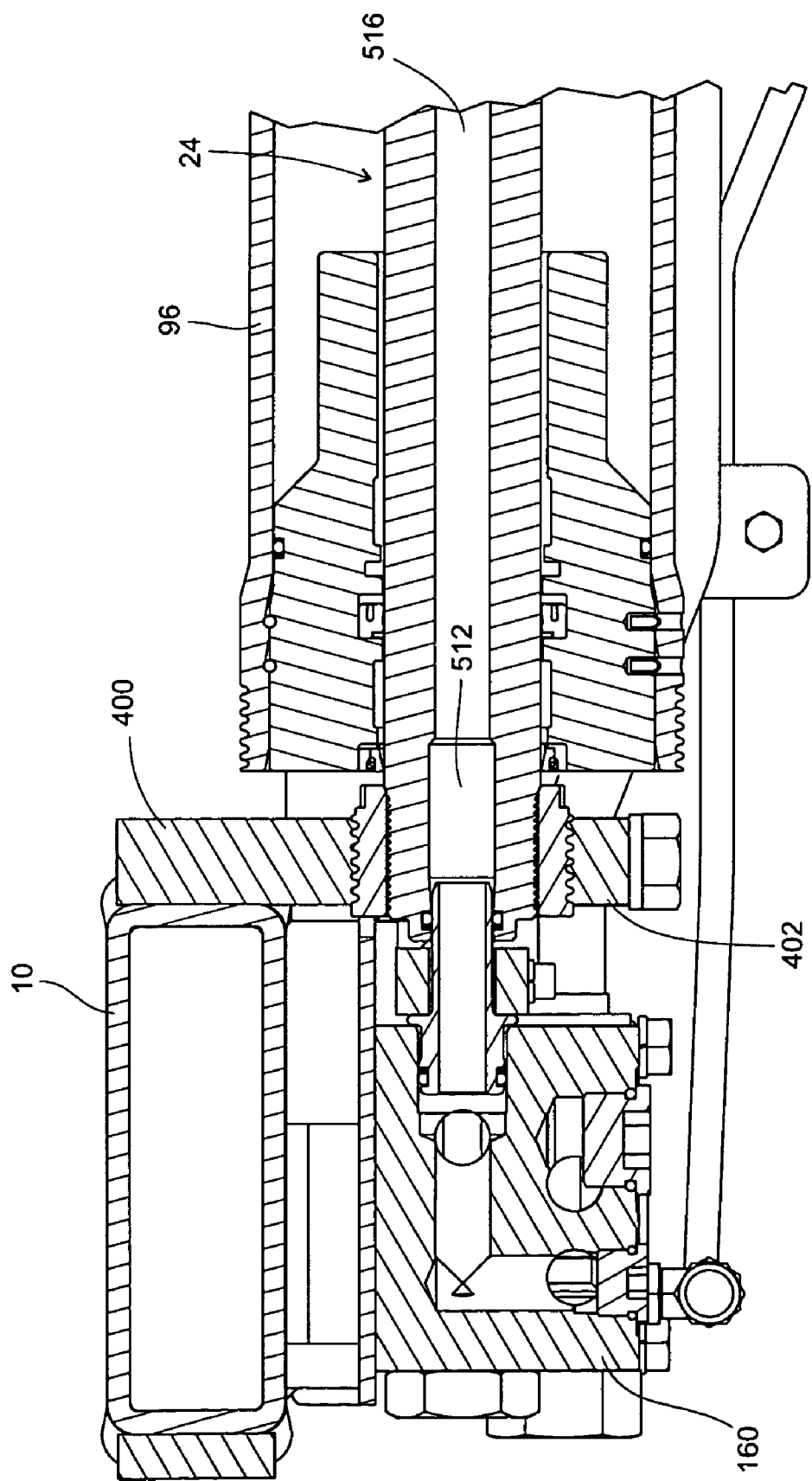
FIG. 58 is a sectional view taken at one end of the drive assembly, showing the parts shown in FIG. 55 being used to connect a port in the manifold to a port in the end of a piston rod end portion.
Figure 59:
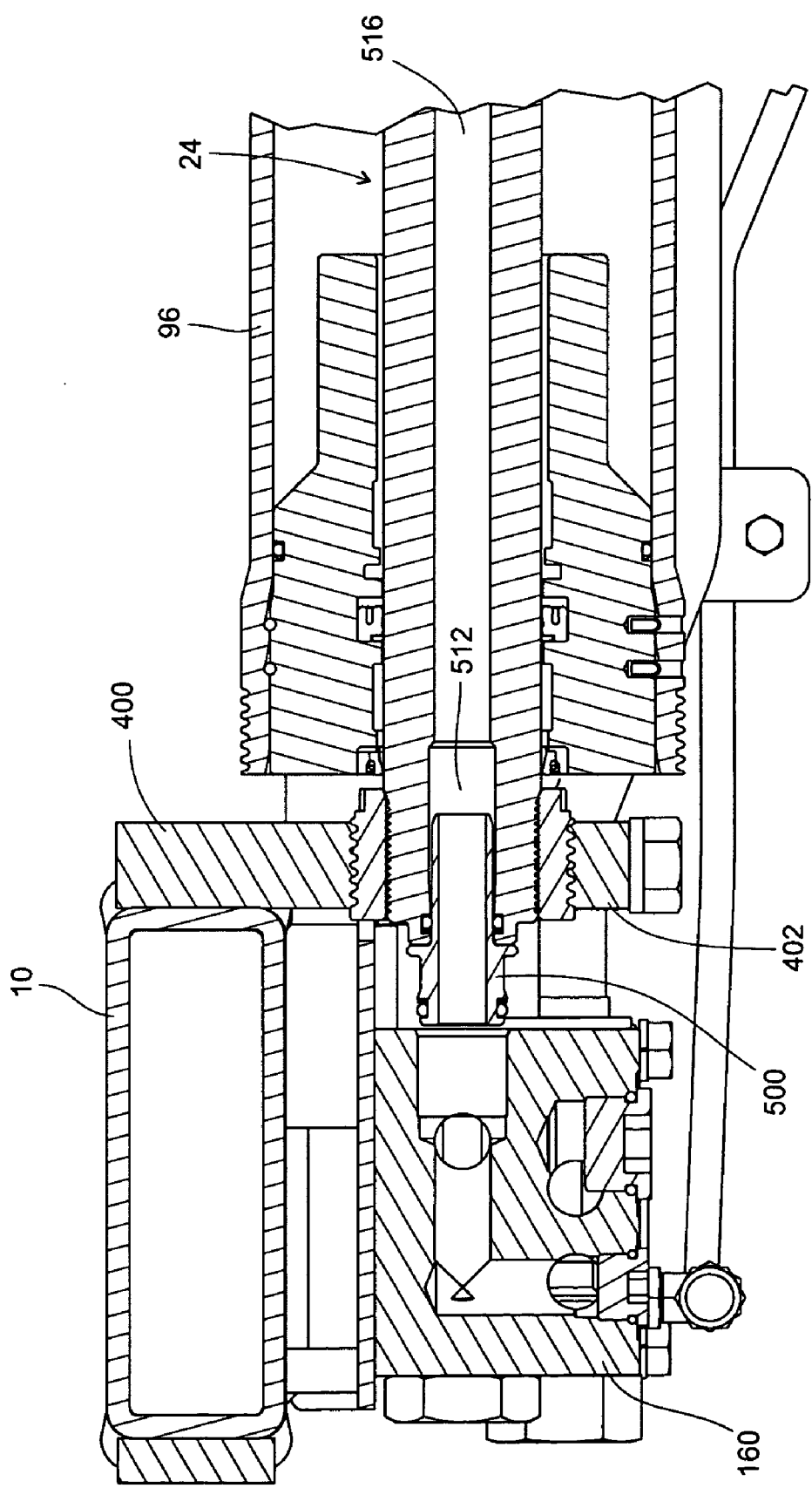
FIG. 59 is a view like FIG. 58, showing the collar removed and the tubular dowel slid endwise into an end portion of the passageway in the piston rod section.

As shown by FIGS. 55 and 56, the tubular dowel 500 is divided into two end portions by a radial flange 506. The end portion 508 to the left of flange 506 fits into the port in the manifold. The end portion 510 on the right side of flange 506 fits into an end portion 512 of the passageway in piston rod end portion 20. Preferably, an external girth groove 514 is formed on end portion 508. As shown by FIGS. 58 and 59, an internal girth groove is formed in the end portion 512 of each piston rod passageway 516, 518, 520. Seal rings 522 and 524 are positioned within girth groove 514. Seal rings 526, 528 are positioned within the internal girth groove formed in the end portions 512 of the passageways 516, 518, 520.

The end portion 508 of the tubular dowel 500 is slideable axially into and out from its port in the manifold. The seal rings 522, 524 move with the tubular dowel 500 as it is moved into and out from the manifold port. Seal rings 526, 528 do not move. They are stationary relative to the piston rod end portions 20, 22, 24. End portion 510 of tubular dowel 500 moves endwise into and out from the end portion 512 in the passageways 516, 518, 520 and moves relative to the seal rings 526, 528. Despite this movement, the seal rings 522, 524 seal against leakage between the tubular dowel 500 and the manifold port and between the tubular dowel end portion 510 and the walls of the passageway sections 512.

Figure 57:
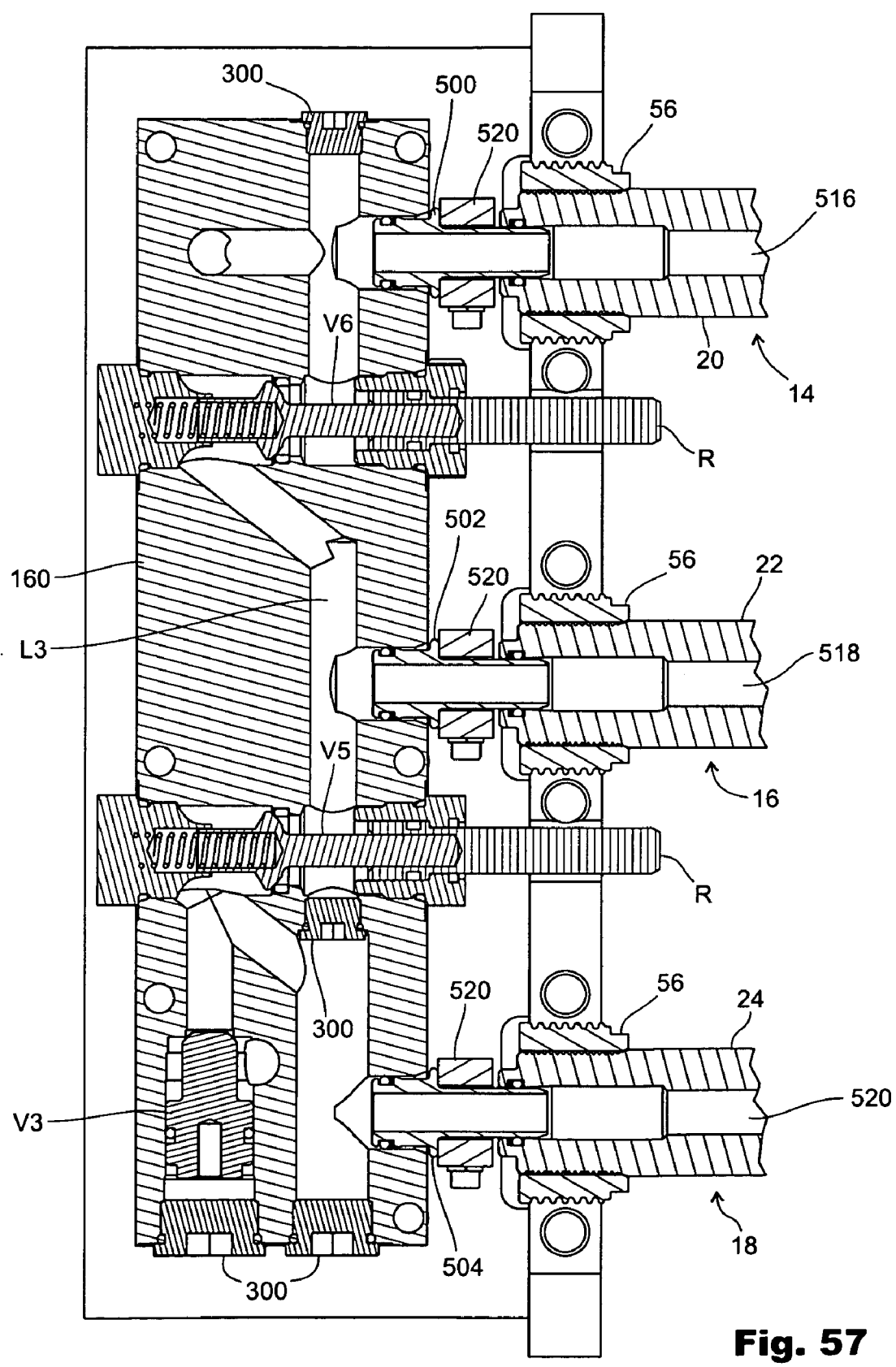
FIG. 57 is a view like FIG. 13, but showing the parts shown by FIG. 54 connecting the manifold to the piston rod end portions of the drive units.

Referring to FIGS. 57-59, there is an axial space between the manifold and the ends of the piston rod end portions 20, 22, 24. When the tubular dowel 500 is installed, it bridges the space or gap between the manifold and the ends of the piston rod end portions. Referring to FIG. 55, a collar 530 is positionable on the mid portion of the tubular dowel 500 that is in the axial space between radial flange 506 and piston rod end surface 522. The collar 520 is a substantially U-shaped member composed of arms 522, 524 and an end wall 528. The end of the collar 520 opposite of end wall 528 is open. This allows the collar 520 to be slid endwise of itself and crosswise of the tubular dowel 500. This movement of the collar 520 towards the tubular dowel 500 moves the center portion of the tubular collar 500 relatively into the open end 528 until the collar 520 has moved onto the tubular dowel 500. A bolt 530 is inserted through an opening 532 in collar arm 522 and then into an internally threaded opening (not shown) in the collar arm 524. When bolt 530 is installed, the center portion of the tubular dowel 500 is captured between collar end wall 528 and the shank of bolt 530. This prevents inadvertent removal of the collar off from the tubular dowel 500. As shown by FIG. 58, when the collar 520 is installed on the tubular dowel 500, it substantially fills the space between the radial flange 506 and the end surface 522. As a result, it prevents endwise movement of the tubular dowel 500.

When it is desired to disconnect a drive unit 14, 16, 18, the opposite ends of the piston rod end portions 20, 22, 24 and 26, 28, 30 are first disconnected from their manifolds. Then, they are disconnected from the end members of the mounting frame. This is quite easily done. First, the bolts 530 are removed and the collars 520 are slid sideways off from the tubular dowels 500. Then, the tubular dowels 500 are slid endwise into the passageway end portions 512 in the piston rod end portions 14, 16, 18 and 20, 22, 24. This sliding can occur until the radial flange 506 is against the end surface 522 on the piston rod end portion. As shown by FIG. 59, when this occurs, the manifold end 540 of the tubular dowel 500 is completely from the port in the manifold. Then, the removable clamps 402 can be removed, allowing the drive unit 14, 16, 18 to be dropped away from the mounting frame. As can be readily seen, the drive unit 14, 16, 18 can be reinstalled one at a time by a reversal of these steps.

The illustrated embodiments are only examples of the present invention and, therefore, are non-limitive. It is to be understood that many changes in the particular structure, materials and features of the embodiments may be made without departing from the spirit and scope of the invention. Therefore, it is our intention that our patent rights are not to be limited by the particular embodiments that are illustrated and described herein but rather are to be determined by the claims which follow interpreted in accordance with the established principles of patent claim construction.

What is claimed is:

1. A reciprocating slat conveyor, comprising:
   a transverse mounting beam;
   three side-by-side hydraulic drive units, each extending longitudinally of the conveyor and transversely of the mounting beam, said piston rods having end sections that are removably connectable to the transverse mounting beam;
   said transverse mounting beam including three fixed clamp parts, one for each drive unit;
   three removable clamp parts, one for each fixed clamp part;
   fasteners for removably connecting each removable clamp parts to a said fixed part, wherein an end part of the piston rod for each drive unit is positioned between the fixed and removable clamp parts for that drive unit, said fastener securing the clamp parts together for clamping the end parts of the piston rods to the transverse mounting beam;
   each said piston rod end section including a longitudinal fluid passageway having an end opening that is positioned outwardly of the fixed and removable clamp parts for said piston rod;
   a manifold secured to the mounting beam outwardly of the end openings in the piston rods end sections, said manifold including a port for each piston rod end opening, each said port confronting the end opening in its piston rod end section;
   a connector for each port and piston rod end section, positioned outwardly of the fixed and removable clamp parts, for removably connecting each manifold port to the end opening in the related piston rod end section; and
   whereby the manifold ports can be disconnected from the end openings in the piston rod end sections, and the removable clamp parts can be removed and the drive units can be separately moved away from the transverse mounting beam.

2. The reciprocating slat conveyor of claim 1, where each piston rod end section has an externally threaded nipple that is outwardly of the clamp parts when the drive units are clamped to the transverse mounting beam, and each connector includes an inlet/outlet tube extending outwardly from each port towards the externally threaded nipple of its piston end part, and a sleeve that engages said inlet/outlet tube and has internal threads for engaging the external threads on the nipple at the end of the related piston rod, said sleeve being rotatable for causing its internal threads to mate with the external threads on the nipple, for connecting the port to the end opening in the piston rod end section.

3. A reciprocating slat conveyor, comprising:
   a traverse mounting beam;
   three side-by-side hydraulic units, each extending longitudinally of the conveyor and transversely of the mounting beam, said drive units having end sections that are removably connected to the transverse mounting beam;
   each drive unit end section including a longitudinal motive fluid passageway having an outer end opening;
   a manifold outwardly of the outer end openings in the drive unit end sections, said manifold including a port for each drive unit outer end opening that is aligned with its drive unit outer end opening;
   a coupling for connecting each drive unit outer end opening with its manifold port, said coupling comprising a tubular dowel having a first end portion that fits inside of the drive unit outer end opening and a second end portion that fits inside of the manifold port;
   a first seal between the first end portion of each tubular dowel and its drive unit outer end portion; and
   a second seal between the second end portion of each tubular dowel and its manifold port.

4. The reciprocating slat conveyor of claim 3, wherein the drive unit end sections are piston rod end sections.

5. The reciprocating slat conveyor of claim 4, wherein the piston rod end sections include external threads and a nut on said threads, and said conveyor includes a first clamp member secured to the mounting beam and a second clamp member that is detachably connectable to the first clamp members, said first and second clamp members receiving between them the nuts that are on the piston rod end sections.

6. The reciprocating slat conveyor of claim 5, wherein each nut includes alternating rings and roves on its outer surface and the clamp members include complementary rings and grooves, whereby rotation of each nut on its piston rod end section will axially position the rings and grooves on the nuts on the piston rod end section.

7. The reciprocating slat conveyor of claim 3, comprising a collar that is removably secured to each tubular dowel axially between the manifold and the drive unit end section.

8. The reciprocating slat conveyor of claim 7, wherein the collar has a top, bottom, a closed end and an open end, wherein the open end of the collar is adapted to receive the tubular dowel and place end portions of the top and bottom outwardly adjacent the tubular dowel, and said collar includes a bolt fastener extendable through an opening through the top and bottom of the collar and threadable into a threaded opening in the other of said top and bottom.

9. The reciprocating slat conveyor of claim 3, wherein the tubular dowel has a radial flange on its spaced axially inwardly of the tubular dowel from the end of the tubular dowel that first into the port in the manifold, whereby said tubular flange provides a stop to limit the inward movement of the tubular dowel into the port in the manifold.

10. The reciprocating slat conveyor of claim 9, wherein the end opening in the fluid passageway in the end section of the drive unit is adapted to permit the tubular dowel to be moved into said opening a sufficient distance to move the second end portion of the tubular dowel out from the manifold port and into a space between the manifold and the drive unit end section.

* * * * *